(12) United States Patent
Huang

(10) Patent No.: US 12,470,338 B2
(45) Date of Patent: Nov. 11, 2025

(54) DATA TRANSMISSION METHOD AND NETWORK DEVICE

(71) Applicant: GUANGDONG OPPO MOBILE TELECOMMUNICATIONS CORP., LTD., Dongguan (CN)

(72) Inventor: Lei Huang, Singapore (SG)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 397 days.

(21) Appl. No.: 18/311,667

(22) Filed: May 3, 2023

(65) Prior Publication Data
US 2023/0275714 A1 Aug. 31, 2023

Related U.S. Application Data

(63) Continuation of application No. PCT/CN2021/123473, filed on Oct. 13, 2021.

(30) Foreign Application Priority Data

Nov. 3, 2020 (SG) .............................. 10202010945P

(51) Int. Cl.
*H04L 5/00* (2006.01)
(52) U.S. Cl.
CPC .......... *H04L 5/0044* (2013.01); *H04L 5/0078* (2013.01)
(58) Field of Classification Search
None
See application file for complete search history.

(56) References Cited

U.S. PATENT DOCUMENTS 9,629,127 B2 4/2017 Chu et al.
10,153,857 B1 * 12/2018 Chu ..................... H04W 72/21
(Continued)

FOREIGN PATENT DOCUMENTS

WO 2016175941 A1 11/2016
WO 2016197349 A1 12/2016
WO 2020028015 A1 2/2020

OTHER PUBLICATIONS

International Search Report and Written Opinion dated Jan. 5, 2022 in International Application No. PCT/CN2021/123473. English translation attached.

(Continued)

*Primary Examiner* — Otis L Thompson, Jr.
(74) *Attorney, Agent, or Firm* — Sheppard, Mullin, Richter & Hampton LLP

(57) ABSTRACT

The present disclosure provides a data transmission method applied in a network device. The method includes obtaining an initial transmission time of a Frequency Domain-Aggregated-Physical layer Protocol Data Unit (FD-A-PPDU) including at least two Multi-User (MU) PPDUs; obtaining an initial number of A-PPDU padding symbols for each of the at least two MU PPDUs; determining a first transmission time of the FD-A-PPDU and a first number of A-PPDU padding symbols for each of the at least two MU PPDUs based on the initial transmission time of the FD-A-PPDU and the initial number of A-PPDU padding symbols for each of the at least two MU PPDUs; generating the FD-A-PPDU based on the first transmission time of the FD-A-PPDU and the first number of A-PPDU padding symbols for each of the at least two MU PPDUs; and transmitting the generated FD-A-PPDU to a plurality of terminal devices.

20 Claims, 16 Drawing Sheets

(56) References Cited

U.S. PATENT DOCUMENTS

| | | | | |
|---|---|---|---|---|
| 10,826,649 | B1* | 11/2020 | Yu | H04L 1/0058 |
| 2011/0075759 | A1* | 3/2011 | Seok | H04L 1/0083 |
| | | | | 375/295 |
| 2012/0170565 | A1* | 7/2012 | Seok | H04L 69/22 |
| | | | | 370/338 |
| 2015/0195079 | A1* | 7/2015 | Gong | H04L 5/14 |
| | | | | 370/277 |
| 2015/0365972 | A1* | 12/2015 | Seok | H04W 74/0891 |
| | | | | 370/336 |
| 2015/0382342 | A1* | 12/2015 | Seok | H04W 72/21 |
| | | | | 370/336 |
| 2016/0056930 | A1* | 2/2016 | Seok | H04L 5/005 |
| | | | | 370/330 |
| 2016/0057657 | A1* | 2/2016 | Seok | H04L 5/0044 |
| | | | | 370/476 |
| 2016/0057736 | A1* | 2/2016 | Jung | H04W 74/06 |
| | | | | 370/329 |
| 2016/0113034 | A1* | 4/2016 | Seok | H04W 74/04 |
| | | | | 370/329 |
| 2016/0192397 | A1* | 6/2016 | Kim | H04W 74/0816 |
| | | | | 370/336 |
| 2017/0048048 | A1* | 2/2017 | Seok | H04L 1/1607 |
| 2017/0150493 | A1* | 5/2017 | Seok | H04B 7/0617 |
| 2017/0181187 | A1* | 6/2017 | Asterjadhi | H04W 74/006 |
| 2017/0201975 | A1* | 7/2017 | Yang | H04B 7/0671 |
| 2017/0202019 | A1* | 7/2017 | You | H04W 74/0808 |
| 2018/0167879 | A1* | 6/2018 | Kim | H04W 52/02 |
| 2018/0176901 | A1* | 6/2018 | Huang | H04L 1/0008 |
| 2019/0297674 | A1* | 9/2019 | Min | H04W 80/08 |
| 2020/0008267 | A1* | 1/2020 | Noh | H04L 1/0059 |
| 2020/0052832 | A1* | 2/2020 | Tian | H04L 1/1614 |
| 2020/0213893 | A1* | 7/2020 | Inohiza | H04W 28/0257 |
| 2020/0228241 | A1* | 7/2020 | Da Silva | H04L 1/0082 |
| 2020/0252156 | A1* | 8/2020 | Lomayev | H04L 1/0041 |
| 2020/0314920 | A1* | 10/2020 | Seok | H04W 74/0808 |
| 2020/0322008 | A1* | 10/2020 | Lomayev | H04B 7/0456 |
| 2020/0404680 | A1* | 12/2020 | Chu | H04W 72/0446 |
| 2021/0014811 | A1* | 1/2021 | Seok | H04W 76/15 |
| 2021/0111935 | A1* | 4/2021 | Chen | H04L 5/0091 |
| 2021/0359885 | A1* | 11/2021 | Shellhammer | H04L 27/2621 |
| 2022/0053371 | A1 | 2/2022 | Yu et al. | |
| 2022/0116885 | A1* | 4/2022 | Hu | H04W 74/0808 |
| 2022/0191560 | A1* | 6/2022 | Bae | H04N 21/43637 |
| 2022/0338251 | A1* | 10/2022 | Hwang | H04B 7/0452 |
| 2022/0353123 | A1* | 11/2022 | Kim | H04L 27/2603 |
| 2022/0369159 | A1* | 11/2022 | Kim | H04L 1/00 |
| 2024/0430745 | A1* | 12/2024 | Yu | H04W 28/065 |

OTHER PUBLICATIONS

"11-20-0674-03-00be-forward-compatible-ofdma" Intel IEEE Mar. 2020 Conference Proposal, Slide 3 to 6.

"11-20-0693-01-00be-aggregated-ppdu-for-large-bw" NXP IEEE May 2020 Conference Proposal, Slide 3 to 5.

"IEEE P802.11ax/D7.0" 802.11ax standard draft, Section 27.3.6 Overview of the PPDU encoding process.

"11-19-1262-15-00be-specification-framework-for-tgbe" 802.11be standard development framework, Section 2.6.1 L-STF, L-LTF, L-SIG and RL_SIG.

"Draft Standard for Information technology—Telecommunications and information exchange between systems Local and metropolitan area networks—Specific requirements", IEEE P802.11be™M/D1.0, May 2021.

Extended European Search Report dated Mar. 20, 2024 received in European Patent Application No. EP21888365.0.

Robert Stacey(Intel): "Proposed draft specification" IEEE Draft, 11-16-0024-00-00AX-Proposed-Draft-Specification, IEEE-SA Mentor, Piscataway, NJ USA, vol. 802.11ax, Jan. 17, 2016 (Jan. 17, 2016), pp. 1-147, XP068158130.

802 11 Working Group of the Standards Society:"Draft standard for Information technology-Tele-comunications and information exchange between systems oca and metropolitan area networks-Specific requirements ??Part 11:Wireless LANMedium Access Control?(MAC)and Physica)Layer(PHY)Specifications ?? Amendment 8:Enhancements for extre"IEEE Draft;DRAFT11BEIEEE-SA Piscataway, NJ USA, vol. 802.11be drafts, No. DO.130 Sep. 2020(Sep. 30, 2020), pp. 1-299, XP068172141.

* cited by examiner

DATA TRANSMISSION METHOD AND NETWORK DEVICE

CROSS-REFERENCE TO RELATED APPLICATIONS

The present application is a continuation of International Application No. PCT/CN2021/123473 filed on Oct. 13, 2021, which claims priority to Patent Application No. 10202010945P, filed on Nov. 3, 2020 with IPOS, which are incorporated herein by reference in their entirety.

FIELD

The present disclosure relates to communication technology, and more particularly, to a data transmission method applied in a network device and the associated network device.

BACKGROUND

IEEE 802.11be Extremely High Throughput (EHT) Wireless Local Area Network (WLAN) supports a Bandwidth (BW) up to 320 MHz. It is expected that High Efficiency (HE) Stations (STAs) will exist with Extremely High Throughput (EHT) STAs in a same EHT Basic Service Set (BSS). In order to maximize throughput of an EHT BSS with a large BW (e.g., 320 MHz), Frequency Domain-Aggregated-Physical layer Protocol Data Unit (FD-A-PPDU) has been proposed.

FIG. 1 shows an example of a 320 MHz BW FD-A-PPDU. As shown in FIG. 1, the 320 MHz BW FD-A-PPDU consists of multiple PPDUs (two PPDUs in this example). Each PPDU occupies one or more non-overlapping 80 MHz frequency segments. The PPDUs are orthogonal in frequency domain symbol-by-symbol. Each PPDU can have different PPDU formats, e.g., HE PPDU, EHT PPDU, etc.

The HE PPDU has two main formats, including a HE Multi-User (MU) PPDU format and a HE Trigger Based (TB) PPDU format. The EHT PPDU has two formats, including an EHT MU PPDU format and an EHT TB PPDU format. HE MU PPDU and EHT MU PPDU are used for downlink MU transmission, and HE TB PPDU and EHT TB PPDU are used for uplink MU transmission.

SUMMARY

According to a first aspect of the present disclosure, a data transmission method applied in a network device is provided. The method includes: obtaining an initial transmission time of a Frequency Domain-Aggregated-Physical layer Protocol Data Unit (FD-A-PPDU) including at least two Multi-User (MU) PPDUs; obtaining an initial number of A-PPDU padding symbols for each of the at least two MU PPDUs; determining a first transmission time of the FD-A-PPDU and a first number of A-PPDU padding symbols for each of the at least two MU PPDUs based on the initial transmission time of the FD-A-PPDU and the initial number of A-PPDU padding symbols for each of the at least two MU PPDUs; generating the FD-A-PPDU based on the first transmission time of the FD-A-PPDU and the first number of A-PPDU padding symbols for each of the at least two MU PPDUs; and transmitting the generated FD-A-PPDU to a plurality of terminal devices.

According to a second aspect of the present disclosure, a network device is provided. The network device includes: a memory having a computer program stored thereon; and a processor configured to invoke and run the computer program whereby the network device is operative to perform the method according to the above first aspect.

BRIEF DESCRIPTION OF THE DRAWINGS

The above and other objects, features and advantages will be more apparent from the following description of embodiments with reference to the figures, in which.

DETAILED DESCRIPTION

Figure 1:
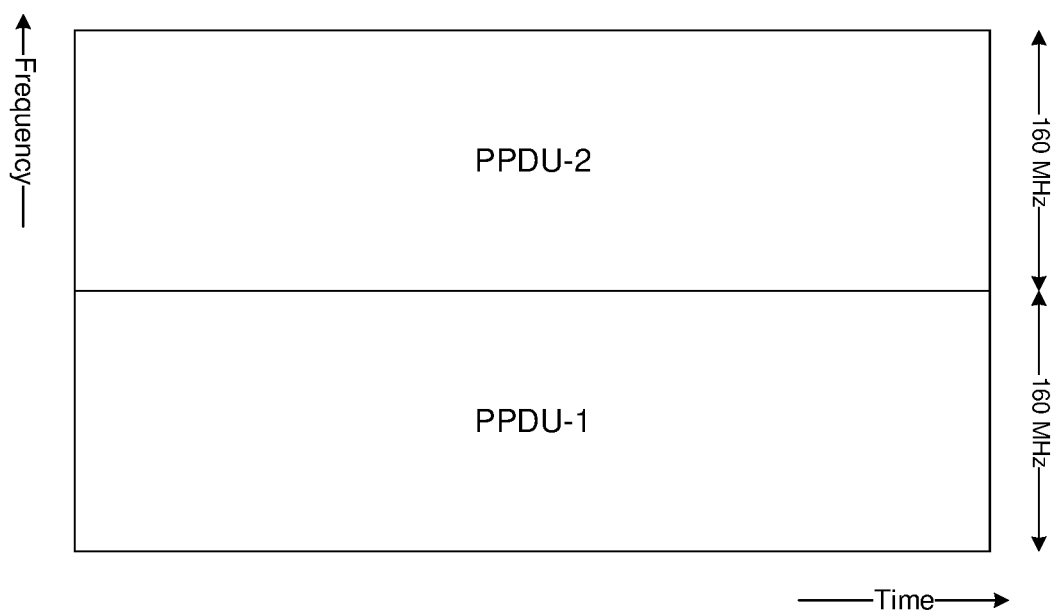
FIG. 1 is a schematic diagram showing an example of a 320 MHz BW FD-A-PPDU.

Hereinafter, the present disclosure will be described with reference to embodiments shown in the attached drawings.

However, it is to be understood that those descriptions are just provided for illustrative purpose, rather than limiting the present disclosure. Further, in the following, descriptions of known structures and techniques are omitted so as not to unnecessarily obscure the concept of the present disclosure.

Various embodiments of the present disclosure can be applied to wireless local area network (WLAN) standards, such as the IEEE 802.11 standards including the IEEE 802.11ax specification and the IEEE 802.11be specification, and/or any other appropriate wireless communication standard, such as the Worldwide Interoperability for Microwave Access (WiMAX), Bluetooth, and/or ZigBee standards, and/or any other protocols either currently known or to be developed in the future.

The following descriptions will be made in combination with a terminal device and a network device. The network device refers to a device in a wireless communication network via which a terminal device accesses the network and receives services therefrom, and the terminal device refers to any end device that can access a wireless communication network and receive services therefrom. By way of example and not limitation, the network device refers to a base station (BS), an access point (AP), or any other suitable device in the wireless communication network; and the terminal device refers to a mobile terminal, user equipment (UE), or other suitable devices. The UE may be, for example, a Subscriber Station (SS), a Portable Subscriber Station, a Mobile Station (MS), or an Access Terminal (AT). According to the present disclosure, the terminal device can be a station (STAION, STA) in a WLAN, which include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like.

As used herein, a downlink transmission refers to a transmission from the network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

It has been agreed that in an EHT BSS, HE MU PPDU and EHT MU PPDU can be used for downlink MU transmission, and HE TB PPDU and EHT TB PPDU can be used for uplink MU transmission.

However, it is unclear how to align multiple MU PPDUs in a downlink FD-A-PPDU so that they have as a similar duration as possible.

It is an object of the present disclosure to provide a network device and a data transmission method therein, capable of solving or mitigating at least one of the above problems.

The present disclosure proposes to prepare by a network device a FD-A-PPDU destined for multiple STAs, e.g., those existing within a same EHT BSS, in such a manner that a misalignment time among multiple MU PPDUs contained in the FD-A-PPDU can be as small as possible. The multiple MU PPDUs may include, e.g., one HE MU PPDU and one or more EHT MU PPDUs.

Figure 2A:
FIG. 2A is a schematic diagram showing a HE MU PPDU format.
Figure 2B:
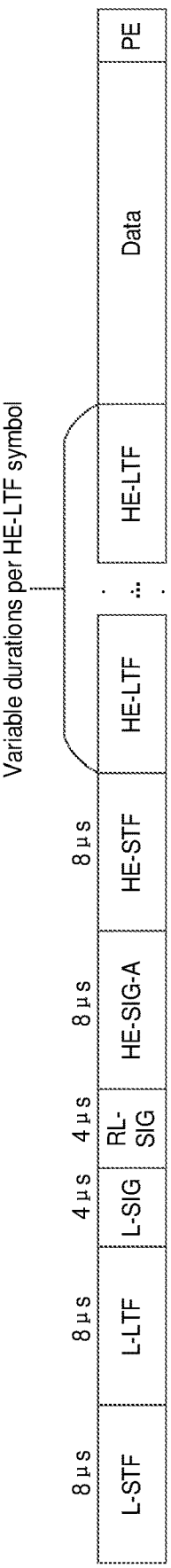
FIG. 2B is a schematic diagram showing a HE TB PPDU format.

The HE MU PPDU format as shown in FIG. 2A is used for transmission to one or more users. The HE TB PPDU format as shown in FIG. 2B is used for a transmission that is a response to a triggering frame from an Access Point (AP). A duration of HE-Short Training Field (HE-STF) in the HE TB PPDU is twice a duration of HE-STF in the HE MU PPDU. A HE SIGNAL B field (HE-SIG-B) is present in the HE MU PPDU but is absent from the HE TB PPDU. In the HE MU PPDU, Non-High Throughput (HT) Short Training Field (L-STF), Non-HT Long Training Field (L-LTF), Non-HT SIGNAL field (L-SIG), Repeated L-SIG (RL-SIG), HE SIGNAL A field (HE-SIG-A) and HE-SIG-B are called pre-HE modulated fields while the HE-STF, HE-LTF, Data field and Packet Extension (PE) field are called HE modulated fields. In a HE TB PPDU, the L-STF, L-LTF, L-SIG, RL-SIG and HE-SIG-A are called pre-HE modulated fields while the HE-STF, HE-LTF, Data field and PE field are called HE modulated fields.

For a HE PPDU, each HE-LTF symbol has the same GI (Guard interval) duration as each data symbol, which is 0.8 μs, 1.6 μs or 3.2 μs. The HE-LTF includes three types: 1×HE-LTF, 2×HE-LTF and 4×HE-LTF. The duration of each 1×HE-LTF, 2×HE-LTF or 4×HE-LTF symbol without GI is 3.2 μs, 6.4 μs or 12.8 μs. Only 2×HE-LTF and 4×HE-LTF are supported in HE MU PPDU. Each data symbol without GI is 12.8 μs. The PE field duration of a HE PPDU is 0 μs, 4 μs, 8 μs, 12 μs or 16 μs.

Figure 3A:
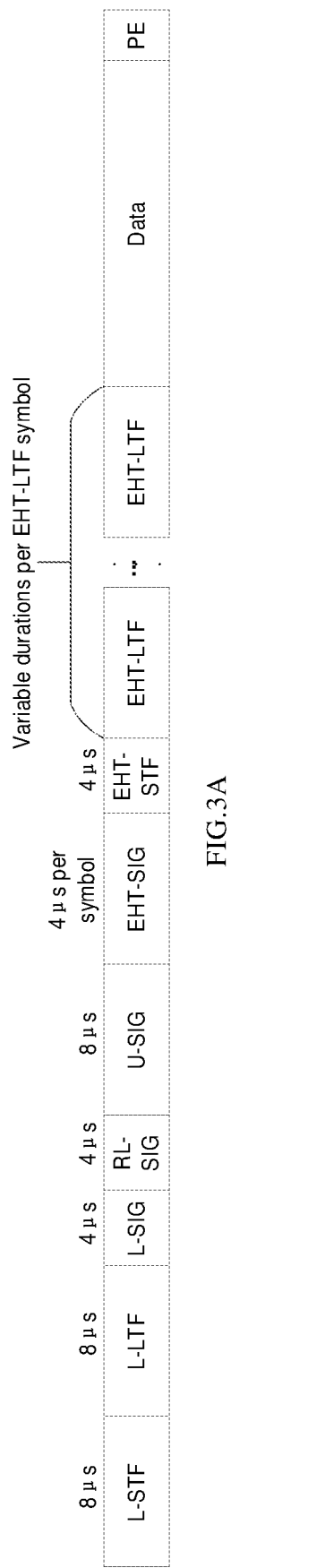
FIG. 3A is a schematic diagram showing an EHT MU PPDU format.
Figure 3B:
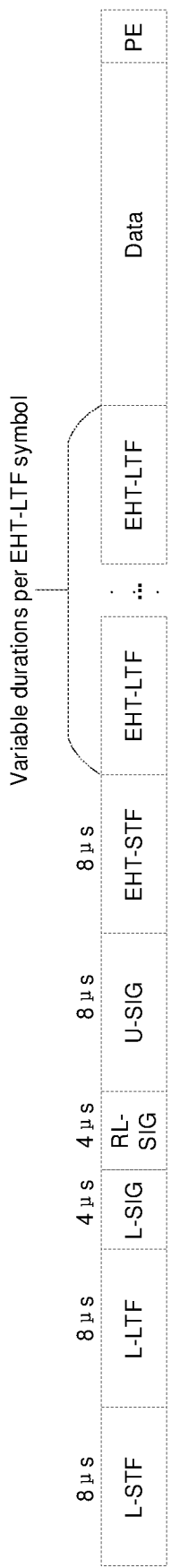
FIG. 3B is a schematic diagram showing an EHT TB PPDU format.

The EHT PPDU has two formats, including an EHT MU PPDU format and an EHT TB PPDU format. The EHT MU PPDU format as shown in FIG. 3A is used for transmission to one or more users. An EHT SIGNAL field (EHT-SIG) is present in the EHT MU PPDU. The EHT TB PPDU format as shown in FIG. 3B is used for a transmission that is a response to a triggering frame from an AP. The EHT-SIG is not present in the EHT TB PPDU. The duration of the EHT-STF in the EHT TB PPDU is twice the duration of the EHT-STF in the EHT MU PPDU. In an EHT MU PPDU, the L-STF, L-LTF, L-SIG, RL-SIG, Universal SIGNAL field (U-SIG) and EHT-SIG are called pre-EHT modulated fields while the EHT-STF, EHT-LTF, Data field and PE field are called EHT modulated fields. In an EHT TB PPDU, the L-STF, L-LTF, L-SIG, RL-SIG and U-SIG are called pre-EHT modulated fields while the EHT-STF, EHT-LTF, Data field and PE field are called EHT modulated fields.

For an EHT PPDU, each EHT-LTF symbol has the same GI duration as each data symbol, which is 0.8 μs, 1.6 μs or 3.2 μs. The EHT-LTF includes three types: 1×EHT-LTF, 2× EHT-LTF and 4×EHT-LTF. The duration of each 1×EHT-LTF, 2×EHT-LTF or 4×EHT-LTF symbol without GI is 3.2 μs, 6.4 μs or 12.8 μs. Each data symbol without GI is 12.8 μs. The PE field duration of an EHT PPDU is 0 μs, 4 μs, 8 μs, 12 μs, 16 μs or 20 μs.

According to the present disclosure, in an EHT BSS with a large BW (e.g., 160 MHz or 320 MHz), a FD-A-PPDU used for downlink transmission may include a single HE MU PPDU and one or two EHT MU PPDUs if the number of HE-SIG-B symbols is equal to the number of EHT-SIG symbols; and the HE-LTF field has a same symbol duration and a same GI duration as the EHT-LTF field. The number of HE-LTF symbols may be the same as or different from the number of EHT-LTF symbols. When the number of HE-LTF symbols is the same as the number of EHT-LTF symbols, each HE-LTF/EHT-LTF symbol may have a different duration or a same duration from each data symbol. In other words, each HE-LTF/EHT-LTF symbol without GI may be 6.4 μs or 12.8 μs. When the number of HE-LTF symbols is different from the number of EHT-LTF symbols, each HE-LTF/EHT-LTF symbol shall have a same duration as each data symbol. In other words, each HE-LTF/EHT-LTF symbol without GI shall be 12.8 μs. As a result, the pre-HE modulated fields of a HE MU PPDU and the pre-EHT modulated fields of an EHT MU PPDU can be kept orthogonal in frequency domain symbol-by-symbol.

For downlink transmission, a HE STA only needs to process the pre-HE modulated fields of a HE MU PPDU within primary 80 MHz channel (P80); while an EHT STA only needs to process the pre-EHT modulated fields of an EHT MU PPDU within an 80 MHz frequency segment it parks. As a result, for a FD-A-PPDU including a HE PPDU and one or two EHT PPDUs, each intended HE STA shall park in P80 while each intended EHT STA shall park in one of non-primary 80 MHz channel(s) via an enhanced SST mechanism. A non-primary 80 MHz channel is an 80 MHz frequency segment outside P80, e.g., secondary 80 MHz channel (S80) in a 160 MHz or 320 MHz channel.

Figure 4:
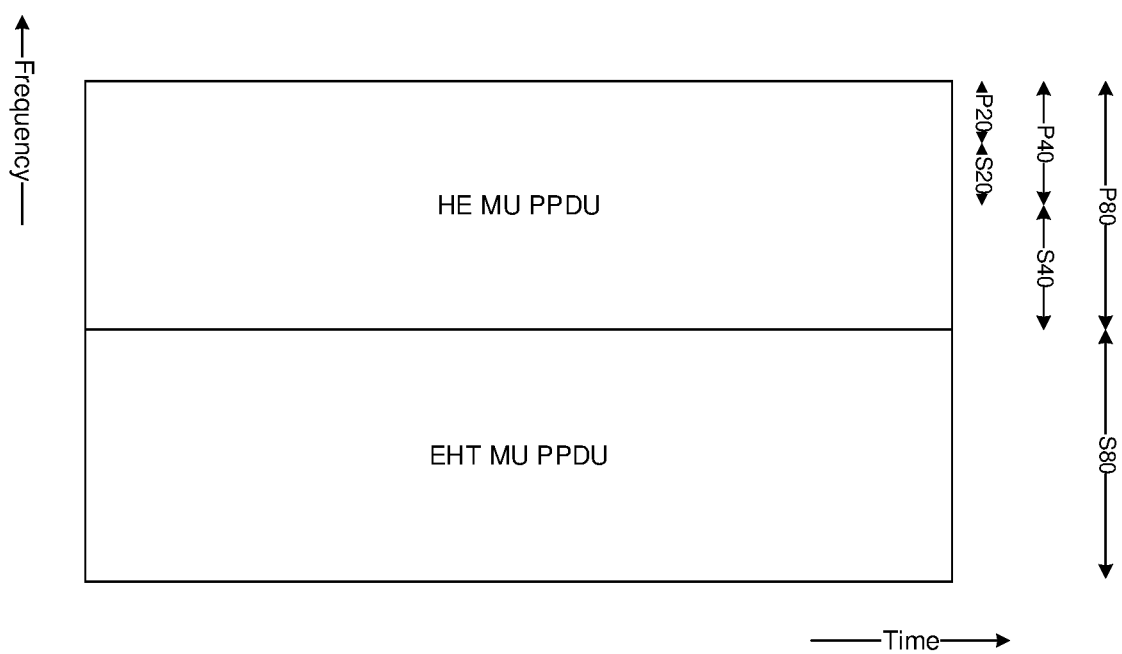
FIG. 4 is a schematic diagram showing an example of 160 MHz BW FD-A-PPDU.

According to the present disclosure, for a 160 MHz BW FD-A-PPDU as illustrated in FIG. 4, BW allocated to HE STAs is P80 while BW allocated to EHT STAs is S80. Each intended HE STA shall park in P80 while each intended EHT STA shall park in S80. Within each of P80 and S80, in one embodiment, a single 20 MHz subchannel which is not P20 may be punctured. In this case, an 80 MHz BW HE MU PPDU to which preamble puncturing may be applied is transmitted in P80 while an 80 MHz BW EHT MU PPDU to which preamble puncturing may be applied is transmitted in S80.

In another embodiment, two consecutive 20 MHz subchannels which do not include P20 may be punctured. In this case, if the punctured two 20 MHz subchannels constitute secondary 40 MHz subchannel (S40), a 40 MHz BW HE MU PPDU is transmitted in P40. If the punctured two 20 MHz subchannels cross P40 and S40, an 80 MHz BW HE MU PPDU with preamble puncturing applied is transmitted in P80. On the other hand, if the punctured two 20 MHz subchannels constitute a 40 MHz subchannel of S80, a 40 MHz BW EHT MU PPDU is transmitted in the other 40 MHz subchannel of S80. If the punctured two 20 MHz subchannels cross the two 40 MHz subchannels of S80, an 80 MHz BW EHT MU PPDU with preamble puncturing applied is transmitted in S80.

According to the present disclosure, in a 320 MHz BW FD-A-PPDU, the BW allocated to HE STAs is P80 or primary 160 MHz channel (P160); while the BW allocated to EHT STAs is one of two 80 MHz frequency segments of secondary 160 MHz channel (S160), S160, a combination of S80 and one of two 80 MHz frequency segments of S160 or a combination of S80 and S160. The number of EHT MU PPDUs in a 320 MHz BW FD-A-PPDU depends on how the BW is allocated to EHT STAs in the FD-A-PPDU. When the BW allocated to EHT STAs is one of two 80 MHz frequency segments of S160 or S160, there is a single EHT MU PPDU in the FD-A-PPDU. When the BW allocated to EHT STAs is a combination of S80 and one of two 80 MHz frequency segments of S160 or a combination of S80 and S160, there is one or two EHT MU PPDUs in the FD-A-PPDU.

Figure 5A:
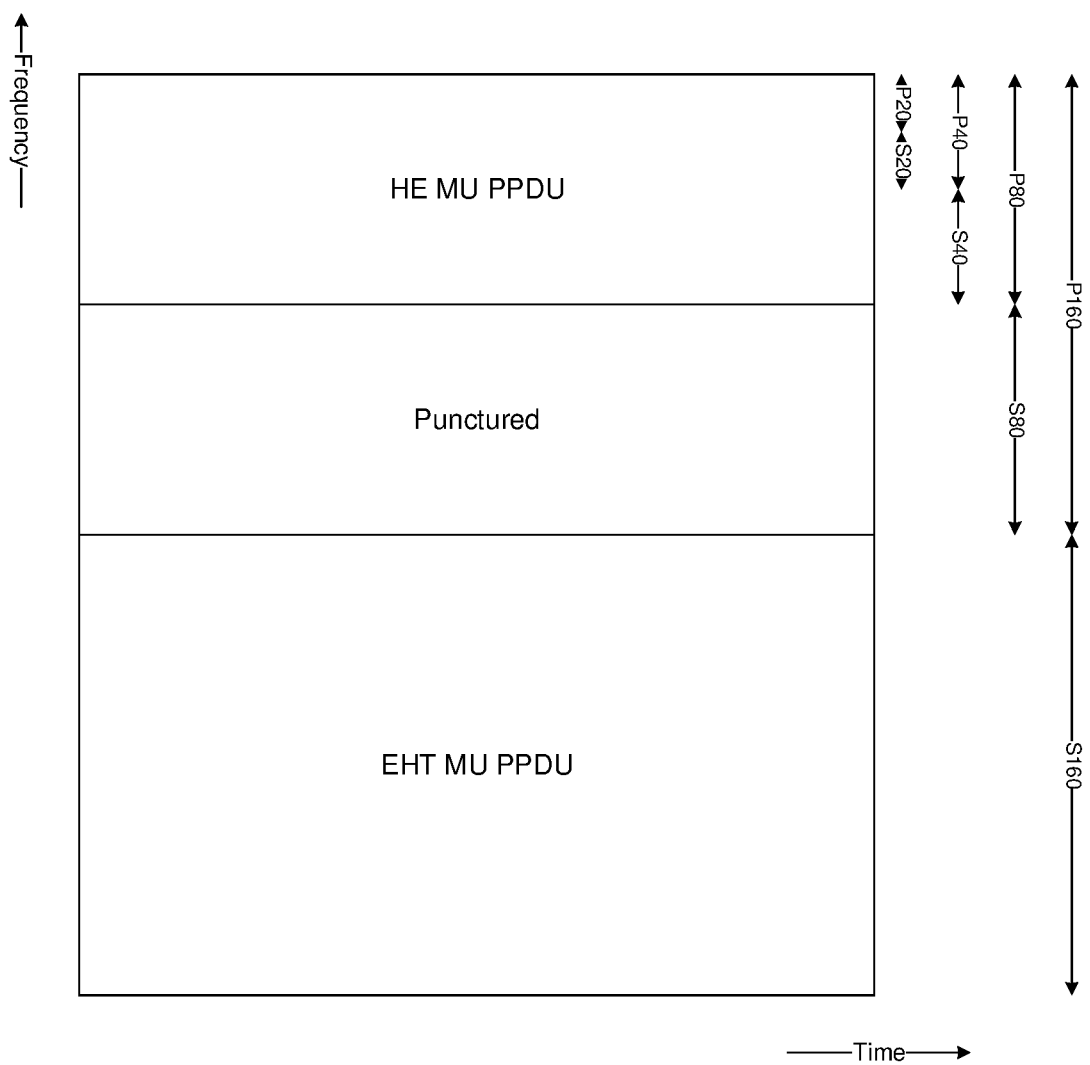
FIG. 5A is a schematic diagram showing a first BW allocation of 320 MHz BW FD-A-PPDU in an EHT BSS (Option 1A)

According to the present disclosure, for a 320 MHz BW FD-A-PPDU, there may be the following five options for BW allocation in the FD-A-PPDU:

Option 1A: When S80 is punctured, BW allocated to HE STAs is P80 and BW allocated to EHT STAs is S160, as illustrated in FIG. 5A.

Figure 5B:
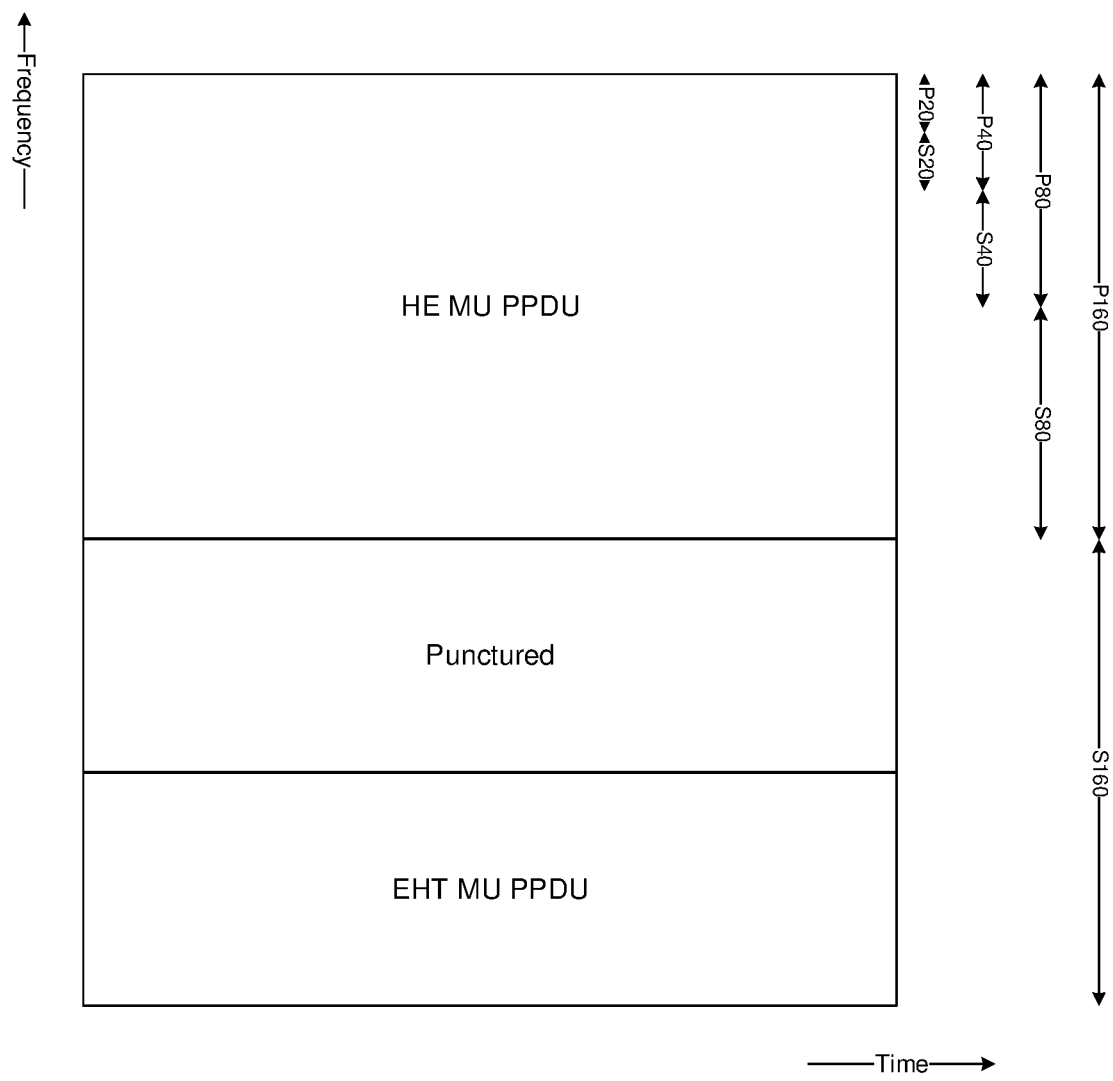
FIG. 5B is a schematic diagram showing a second BW allocation of 320 MHz BW FD-A-PPDU in an EHT BSS (Option 1B)

Option 1B: When one of two 80 MHz frequency segments of S160 is punctured, BW allocated to HE STAs is P160 and BW allocated to EHT STAs is the other 80 MHz frequency segment of S160, as illustrated in FIG. 5B.

Figure 5C:
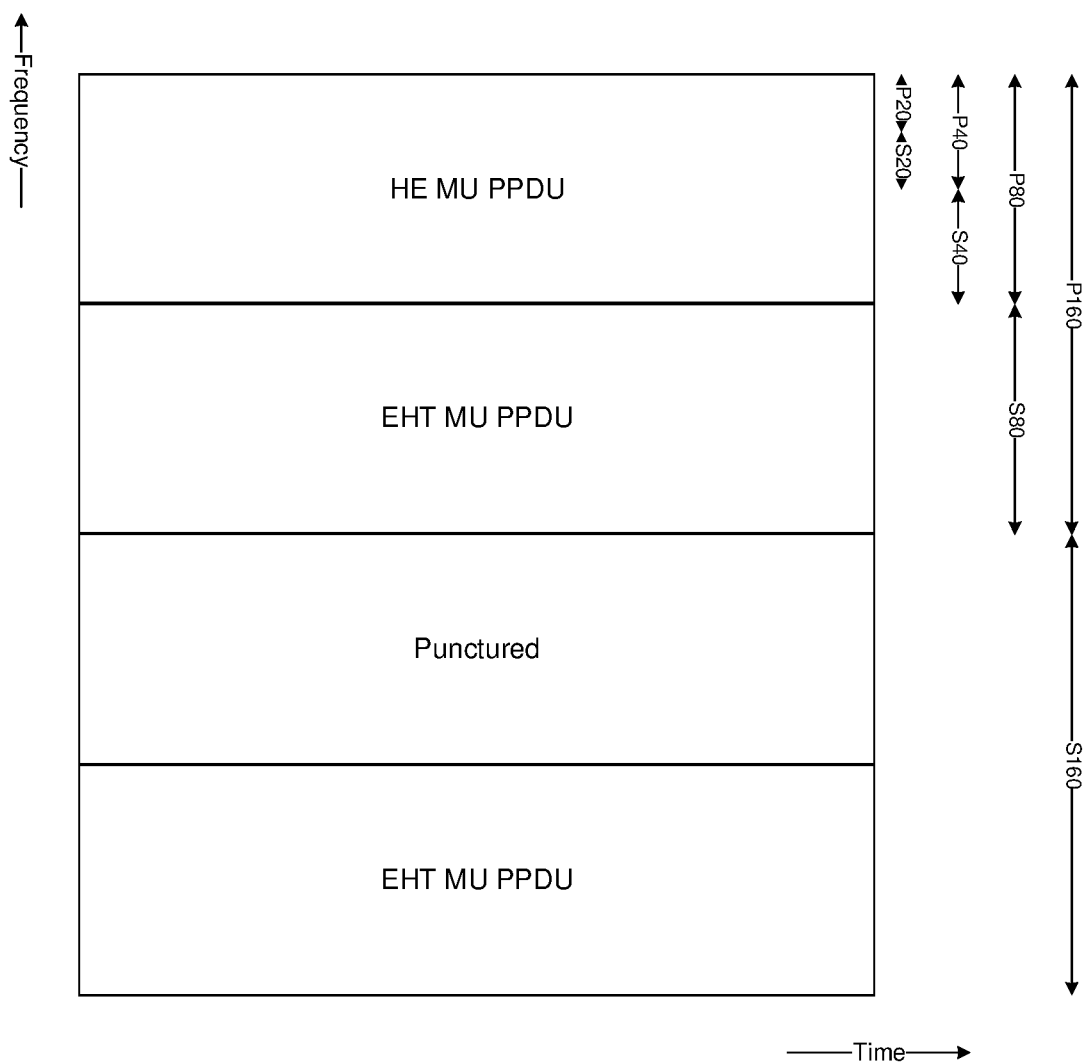
FIG. 5C is a schematic diagram showing a third BW allocation of 320 MHz BW FD-A-PPDU in an EHT BSS (Option 1C)

Option 1C: When one of two 80 MHz frequency segments of S160 is punctured, BW allocated to HE STAs is P80 and BW allocated to EHT STAs is S80 and the other 80 MHz frequency segment of S160, as illustrated in FIG. 5C.

Figure 5D:
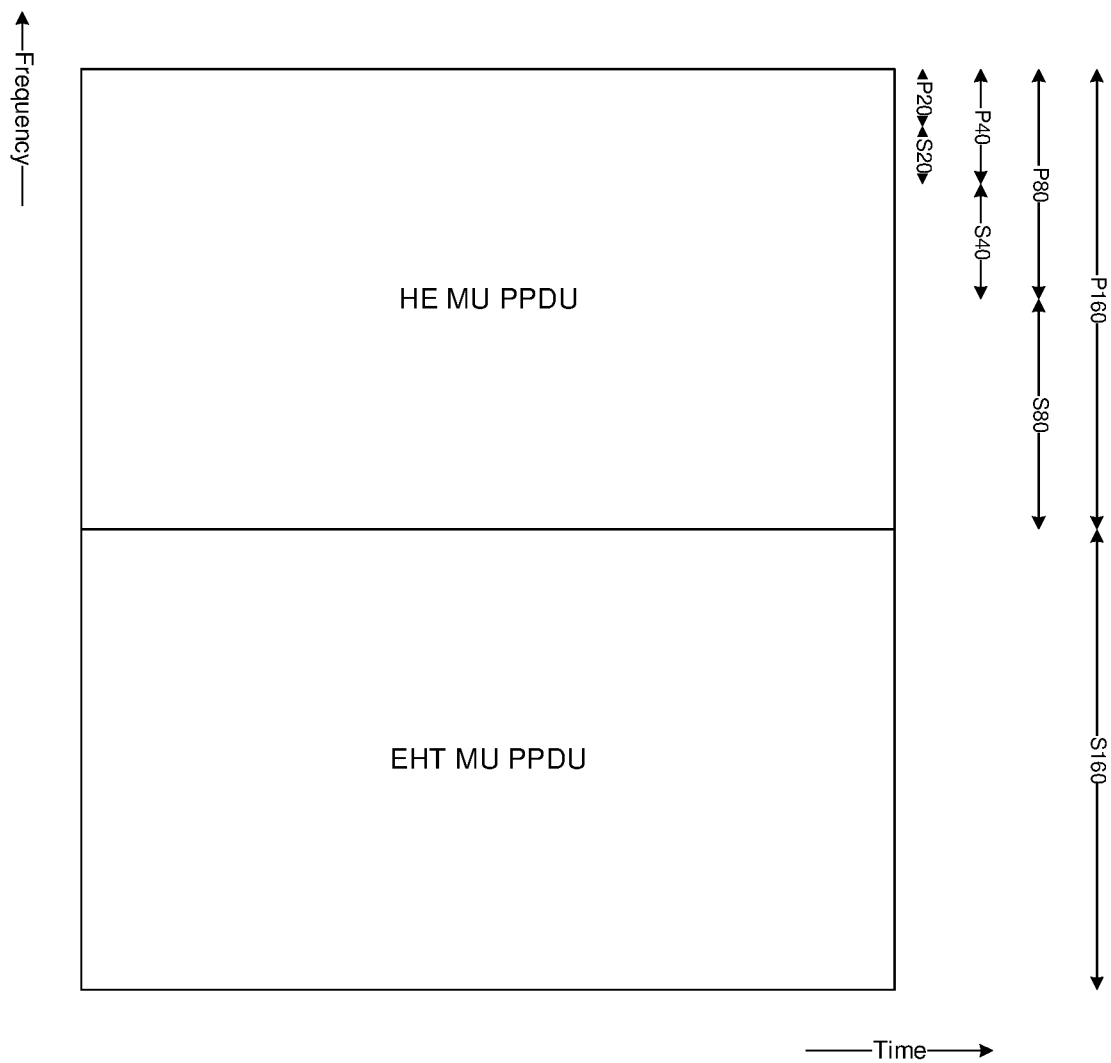
FIG. 5D is a schematic diagram showing a fourth BW allocation of 320 MHz BW FD-A-PPDU in an EHT BSS (Option 1D)

Option 1D: When none of 80 MHz frequency segments is punctured, BW allocated to HE STAs is P160 and BW allocated to EHT STAs is S160, as illustrated in FIG. 5D.

Figure 5E:
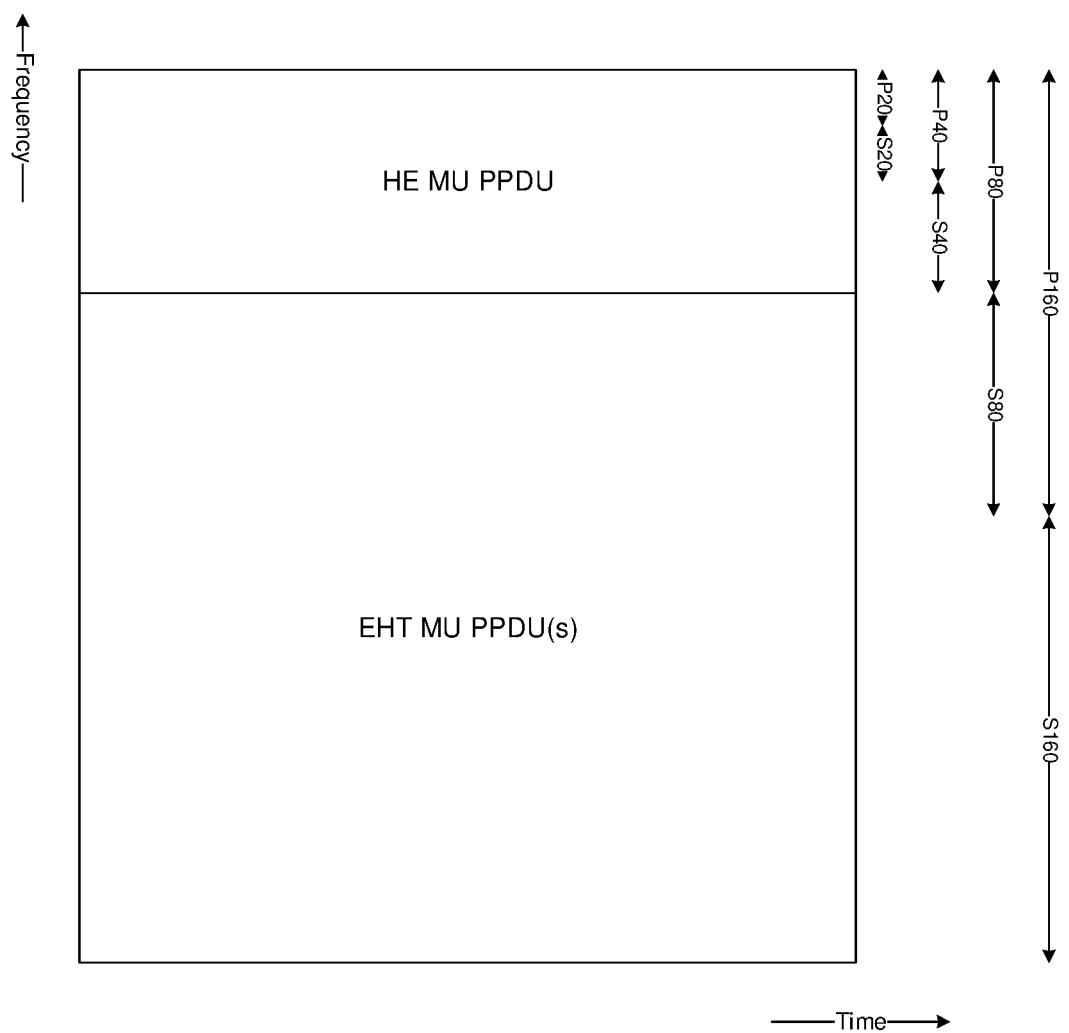
FIG. 5E is a schematic diagram showing a fifth BW allocation of 320 MHz BW FD-A-PPDU PPDU in an EHT BSS (Option 1E)

Option 1E: When none of 80 MHz frequency segments is punctured, BW allocated to HE STAs is P80 and BW allocated to EHT STAs is S80 and S160, as illustrated in FIG. 5E.

According to the present disclosure, as shown in FIG. 5A, regarding Option 1A for a 320 MHz BW FD-A-PPDU, each intended HE STA shall park in P80 while each intended EHT STA shall park in one of two 80 MHz frequency segments of S160. Within P80 or each of the two 80 MHz frequency segments of S160, in one embodiment, a single 20 MHz subchannel which is not P20 may be punctured. In this case, an 80 MHz BW HE MU PPDU to which preamble puncturing may be applied is transmitted in P80 while a 160 MHz BW EHT MU PPDU to which preamble puncturing may be applied is transmitted in S160. In another embodiment, within P80 or each of the two 80 MHz frequency segments of S160, two consecutive 20 MHz subchannels which do not include P20 may be punctured. In this case, if the punctured two 20 MHz subchannels constitute S40, a 40 MHz BW HE MU PPDU is transmitted in P40. If the punctured two 20 MHz subchannels cross P40 and S40, an 80 MHz BW HE MU PPDU with preamble puncturing applied is transmitted in P80. On the other hand, a 160 MHz BW EHT MU PPDU to which preamble puncturing may be applied is transmitted in S160.

According to the present disclosure, as shown in FIG. 5B, regarding Option 1B for a 320 MHz BW FD-A-PPDU, each intended HE STA shall park in P80 while each intended EHT STA shall park in the unpunctured 80 MHz frequency segment of S160. Within P80, S80 or the unpunctured 80 MHz frequency segment of S160, in one embodiment, a single 20 MHz subchannel which is not P20 may be punctured. In this case, a 160 MHz BW HE MU PPDU to which preamble puncturing may be applied is transmitted in P160 while an 80 MHz BW EHT MU PPDU to which preamble puncturing may be applied is transmitted in the unpunctured 80 MHz frequency segment of S160. In another embodiment, within P80, S80 or the unpunctured 80 MHz frequency segment of S160, two consecutive 20 MHz subchannels which do not include P20 may be punctured. In this case, a 160 MHz BW HE MU PPDU to which preamble puncturing may be applied is transmitted in P160. On the other hand, if the punctured two 20 MHz subchannels constitute one 40 MHz subchannel of the unpunctured 80 MHz frequency segment of S160, a 40 MHz BW EHT MU PPDU is transmitted in the other 40 MHz subchannel of the unpunctured 80 MHz frequency segment of S160. If the punctured two 20 MHz subchannels cross the two 40 MHz subchannels of the unpunctured 80 MHz frequency segment of S160, an 80 MHz BW EHT MU PPDU with preamble puncturing applied is transmitted in the unpunctured 80 MHz frequency segment of S160.

According to the present disclosure, as shown in FIG. 5C, regarding Option 1C for a 320 MHz BW FD-A-PPDU, each intended HE STA shall park in P80 while each intended EHT STA shall park in S80 or the unpunctured 80 MHz frequency segment of S160. Within P80, S80 or the unpunctured 80 MHz frequency segment of S160, in one embodiment, a single 20 MHz subchannel which is not P20 may be punctured. In this case, an 80 MHz BW HE MU PPDU to which preamble puncturing may be applied is transmitted in P80. On the other hand, an 80 MHz BW EHT MU PPDU to which preamble puncturing may be applied is transmitted in S80 and another 80 MHz BW EHT MU PPDU to which preamble puncturing may be applied is transmitted in the unpunctured 80 MHz frequency segment of S160. In another embodiment, within P80, S80 or the unpunctured 80 MHz frequency segment of S160, two consecutive 20 MHz subchannels which do not include P20 may be punctured. In this case, if the punctured two 20 MHz subchannels constitute S40, a 40 MHz BW HE MU PPDU is transmitted in P40. If the punctured two 20 MHz subchannels cross P40 and S40, an 80 MHz BW HE MU PPDU with preamble puncturing applied is transmitted in P80. On the other hand, if the punctured two 20 MHz subchannels constitute one 40 MHz subchannel of S80, a 40 MHz BW EHT MU PPDU is transmitted in the other 40 MHz subchannel of S80. If the punctured two 20 MHz subchannels cross two 40 MHz subchannels of S80, an 80 MHz BW EHT MU PPDU with preamble puncturing applied is transmitted in S80. If the punctured two 20 MHz subchannels constitute one 40 MHz subchannel of the unpunctured 80 MHz frequency segment of S160, another 40 MHz BW EHT MU PPDU is transmitted in the other 40 MHz subchannel of the unpunctured 80 MHz frequency segment of S160. If the punctured two 20 MHz subchannels cross two 40 MHz subchannels of the unpunctured 80 MHz frequency segment of S160, another 80 MHz BW EHT MU PPDU with preamble puncturing applied is transmitted in the unpunctured 80 MHz frequency segment of S160.

According to the present disclosure, as shown in FIG. 5D, regarding Option 1D for a 320 MHz BW FD-A-PPDU, each intended HE STA shall park in P80 while each intended EHT STA shall park in one of two 80 MHz frequency segments of S160. Within P80, S80 or each of the two 80 MHz frequency segments of S160, in one embodiment, a single 20 MHz subchannel which is not P20 may be punctured. In this case, a 160 MHz BW HE MU PPDU to which preamble puncturing may be applied is transmitted in P160. On the other hand, a 160 MHz BW EHT MU PPDU to which preamble puncturing may be applied is transmitted in S160. In another embodiment, within P80, S80 or each of the two 80 MHz frequency segments of S160, two consecutive 20 MHz subchannels which do not include P20 may be punctured. In this case, a 160 MHz BW HE MU PPDU to which preamble puncturing may be applied is transmitted in P160. On the other hand, a 160 MHz BW EHT MU PPDU to which preamble puncturing may be applied is transmitted in S160.

According to the present disclosure, as shown in FIG. 5E, regarding Option 1E for a 320 MHz BW FD-A-PPDU, each intended HE STA shall park in P80 while each intended EHT STA shall park in S80 or one of two 80 MHz frequency segments of S160. Within P80, S80 or each of the two 80 MHz frequency segments of S160, in one embodiment, a single 20 MHz subchannel which is not P20 may be punctured. In this case, an 80 MHz BW HE MU PPDU to which preamble puncturing may be applied is transmitted in P80. On the other hand, a 320 MHz BW EHT MU PPDU with preamble puncturing applied is transmitted in S80 and S160. Alternatively, an 80 MHz BW EHT MU PPDU to which preamble puncturing may be applied is transmitted in S80 and another 160 MHz BW EHT MU PPDU to which preamble puncturing may be applied is transmitted in S160. Compared to a 320 MHz BW EHT MU PPDU transmitted in S80 and S160, two separate 80 MHz and 160 MHz BW EHT MU PPDUs transmitted in S80 and S160 may result in lower EHT-SIG overhead. However, in two separate 80 MHz and 160 MHz BW EHT MU PPDUs transmitted in S80 and S160, EHT STAs intended by the 80 MHz BW EHT MU PPDU transmitted in S80 cannot be scheduled in S160, vice versa, which reduces scheduling flexibility. In another embodiment, within P80, S80 or each of the two 80 MHz frequency segments of S160, two consecutive 20 MHz subchannels which do not include P20 may be punctured. In this case, if the punctured two 20 MHz subchannels constitute S40, a 40 MHz BW HE MU PPDU is transmitted in P40. If the punctured two 20 MHz subchannels cross P40 and S40, an 80 MHz BW HE MU PPDU with preamble puncturing applied is transmitted in P80. On the other hand, a 320 MHz BW EHT MU PPDU with preamble puncturing applied is transmitted in S80 and S160. Alternatively, if the punctured two 20 MHz subchannels constitute one 40 MHz subchannel of S80, a 40 MHz BW EHT MU PPDU is transmitted in the other 40 MHz subchannel of S80. If the punctured two 20 MHz subchannels cross two 40 MHz subchannels of S80, an 80 MHz BW EHT MU PPDU with preamble puncturing applied is transmitted in S80. If the punctured two 20 MHz subchannels constitute one 40 MHz subchannel of the unpunctured 80 MHz frequency segment of S160, a 40 MHz BW EHT MU PPDU is transmitted in the other 40 MHz subchannel of the unpunctured 80 MHz frequency segment of S160. If the punctured two 20 MHz subchannels cross two 40 MHz subchannels of the unpunctured 80 MHz frequency segment of S160, an 80 MHz BW EHT MU PPDU with preamble puncturing applied is transmitted in the unpunctured 80 MHz frequency segment of S160.

Figure 6:
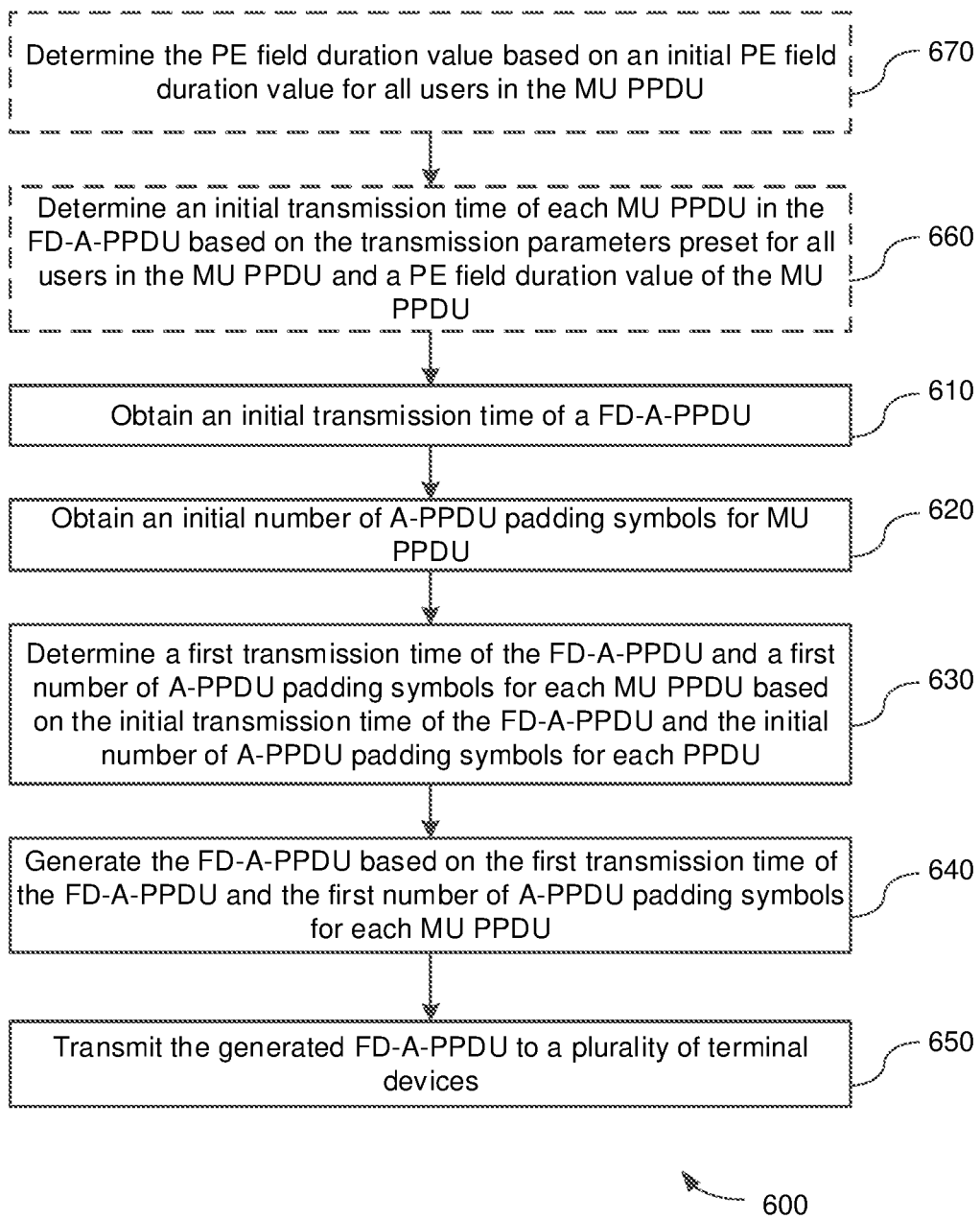
FIG. 6 is a flowchart illustrating a data transmission method 600 in a network device according to embodiments of the present disclosure.

FIG. 6 is a flowchart illustrating a data transmission method 600 according to embodiments of the present disclosure. The data transmission method 600 can be performed at a network device, which may be an AP applicable in IEEE 802.11be EHT WLAN or a next-generation WLAN after EHT WLAN such as Post-EHT WLAN.

At block 610, the network device obtains an initial transmission time of a FD-A-PPDU. The FD-A-PPDU may include at least two MU PPDUs. Here, the FD-A-PPDU can be a 160 MHz BW FD-A-PPDU or a 320 MHz BW FD-A-PPDU, or has any other appropriate BW as required. Further, for such downlink data transmission, the FD-A-PPDU can include one HE MU PPDU and at least one EHT MU PPDU, e.g., one HE MU PPDU and one or two EHT MU PPDU.

Figure 7:
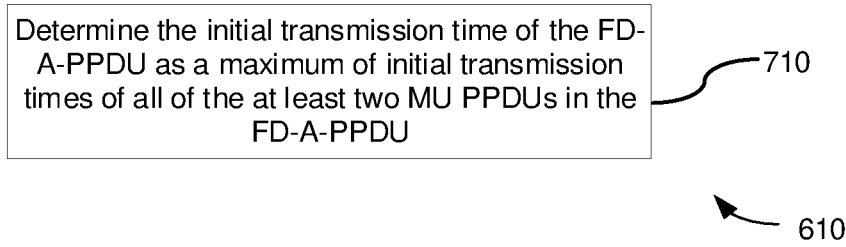
FIG. 7 shows an exemplary implementation of block 610.

FIG. 7 shows an exemplary implementation of block 610. As illustrated, block 610 may be implemented by block 710. At block 710, the network device may determine the initial transmission time of the FD-A-PPDU as a maximum of initial transmission times of all of the at least two MU PPDUs in the FD-A-PPDU, e.g., $$TXTIME_{A\text{-}PPDU,init} = \max\{TXTIME_{MU\text{-}PPDU,init}^{(i)}, i=1, \ldots, N_{MU\text{-}PPDU}\} \quad \text{Equation (1)},$$

where $N_{MU\text{-}PPDU}$ denotes the number of MU PPDUs in the FD-A-PPDU, which is equal to 2 in case of 160 MHz BW FD-A-PPDU and equal to 2 or 3 in case of 320 MHz BW FD-A-PPDU; and $TXTIME_{MU\text{-}PPDU,init}^{(i)}$ denotes the initial transmission time of the i-th MU PPDU in the FD-A-PPDU, which may be derived from transmission parameters for all users in the i-th MU PPDU.

In an embodiment, the transmission parameters preset for all users in the i-th MU PPDU may include one or more of following parameters: a bandwidth allocation for the MU PPDU; information (e.g., denoted as APEP_LENGTH) indicating a number of octets in an Aggregate Medium Access Control Protocol Data Unit (A-MPDU) pre-End Of Frame (pre-EOF) padding carried in a Physical layer Service Data Unit (PSDU) for each user; a Resource Unit (RU) allocation for each user; a number of spatial streams for each user; Modulation and Coding Scheme (MCS) for each user; and nominal packet padding for each user.

For example, the transmission parameters may be included in a first primitive according to the IEEE 802.11ax specification if the i-th MU PPDU is a HE MU PPDU or the IEEE 802.11be specification if the i-th MU PPDU is an EHT MU PPDU. Further, a Physical layer (PHY) entity of the network device may receive the first primitive (e.g., PLME-TXTIME.request primitive) from a Medium Access Control (MAC) sublayer of the network device, which contains a TXVECTOR including a list of transmission parameters required for each user in each of MU PPDUs in a FD-A-PPDU. Then, the PHY entity can e.g., derive the initial transmission time of the i-th MU PPDU in the FD-A-PPDU from the transmission parameters.

Referring back to FIG. 6, at block 620, the network device obtains an initial number of A-PPDU padding symbols for each of the at least two MU PPDUs.

Figure 8:
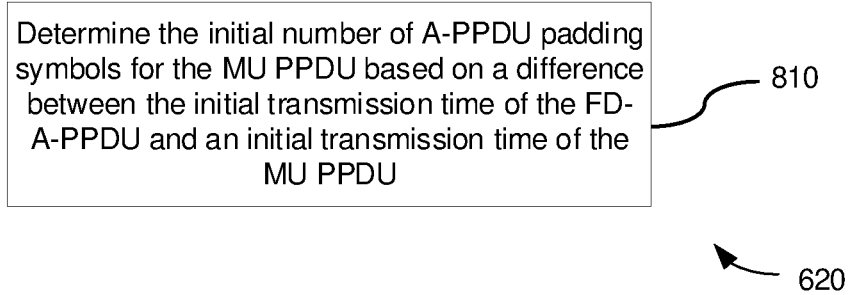
FIG. 8 shows an exemplary implementation of block 620.

FIG. 8 shows an exemplary implementation of block 620. As illustrated, block 620 may be implemented by block 810. At block 810, the network device determines the initial number of A-PPDU padding symbols for the MU PPDU based on a difference between the initial transmission time of the FD-A-PPDU and an initial transmission time of the MU PPDU. That is, the initial number of A-PPDU padding symbols required for a MU PPDU in the FD-A-PPDU depends on the difference between the initial transmission time of the FD-A-PPDU and the initial transmission time of the MU PPDU. For example, the initial number of A-PPDU padding symbols required for a MU PPDU in the FD-A-PPDU may be equal to a ratio of the difference between the initial transmission time of the FD-A-PPDU and the initial transmission time of the MU PPDU to a duration of one data symbol.

In the example involving the equation (1), the initial number of A-PPDU padding symbols required for the i-th MU PPDU in the FD-A-PPDU may be given by:

$$N_{PAD\text{-}SYM,init}^{(i)} = \mathrm{floor}\left(\frac{TXTIME_{A\text{-}PPDU,init} - TXTIME_{MU\text{-}PPDU,init}^{(i)}}{T_{SYM}}\right). \quad \text{Equation (2)}$$

where TSYM denotes a duration of one data symbol.

Referring back to FIG. 6, at block 630, the network device determines a first transmission time of the FD-A-PPDU and a first number of A-PPDU padding symbols for each of the at least two MU PPDUs based on the initial transmission time of the FD-A-PPDU and the initial number of A-PPDU padding symbols for each of the at least two MU PPDUs.

Herein, the first transmission time refers to a time for an actual transmission of the FD-A-PPDU, and may be the same as or different from the initial transmission time of the FD-A-PPDU. Similarly, the first number of A-PPDU padding symbols for each of the at least two MU PPDUs refers to a number of A-PPDU padding symbols actually required for each of the at least two MU PPDUs, and may be the same as or different from the initial number of A-PPDU padding symbols for each of the at least two MU PPDUs.

Figure 9:
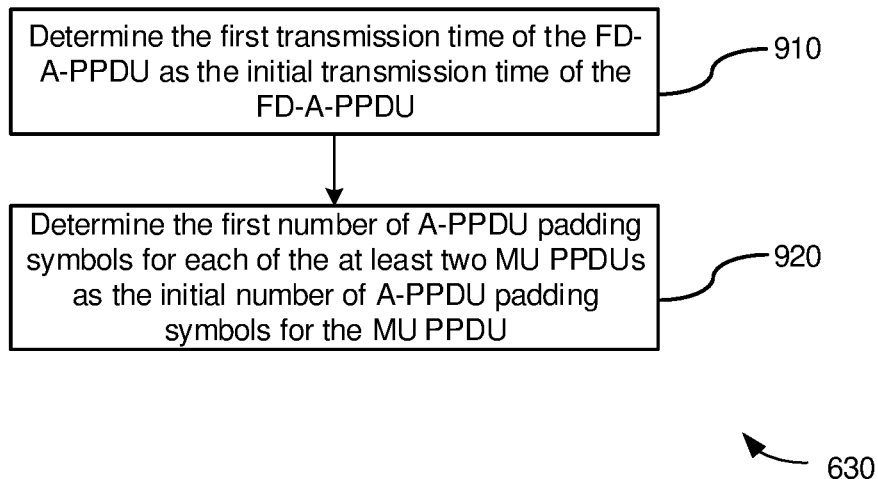
FIG. 9 shows an exemplary implementation of block 630.

FIG. 9 shows an exemplary implementation of block 630. As illustrated, block 630 may be implemented by blocks 910 and 920. At block 910, the network device determines the first transmission time of the FD-A-PPDU as the initial transmission time of the FD-A-PPDU. At block 920, the network device determines the first number of A-PPDU padding symbols for each of the at least two MU PPDUs as the initial number of A-PPDU padding symbols for the MU PPDU. It should be noted a sequence of two steps implemented by blocks 910 and 920 is not limited to that illustrated in FIG. 9, and these two steps can occur at the same time of in any other appropriate sequence. Further, although block 630 is illustrated here as involving both blocks 910 and 920, block 630 may also be implemented by only block 910 or block 920, and the other step may be implemented by any other appropriate way.

In an embodiment, if any of the following conditions is satisfied:
the initial transmission time of HE MU PPDU is equal to or larger than that of any of EHT MU PPDUs in the FD-A-PPDU;
the initial transmission time of HE MU PPDU is smaller than that of at least one EHT MU PPDU in the FD-A-PPDU and STBC (Space-Time Block Coding) is not used in the HE MU PPDU; and
the initial transmission time of HE MU PPDU is smaller than that of at least one EHT MU PPDU in the FD-A-PPDU, STBC is used in the HE MU PPDU and the initial number of A-PPDU padding symbols required for the HE MU PPDU is a multiple of 2, the first number of A-PPDU padding symbols required for the i-th MU PPDU in the FD-A-PPDU is equal to its initial number of A-PPDU padding symbols, i.e., $$N_{PAD-SYM}^{(i)} = N_{PAD-SYM,init}^{(i)} \quad \text{Equation (3);}$$

the transmission time of i-th MU PPDU is equal to its initial transmission time; and the first transmission time of FD-A-PPDU is equal to its initial transmission time, i.e., $$\text{TXTIME}_{A-PPDU} = \text{TXTIME}_{A-PPDU,init} \quad \text{Equation (4).}$$

Figure 10:
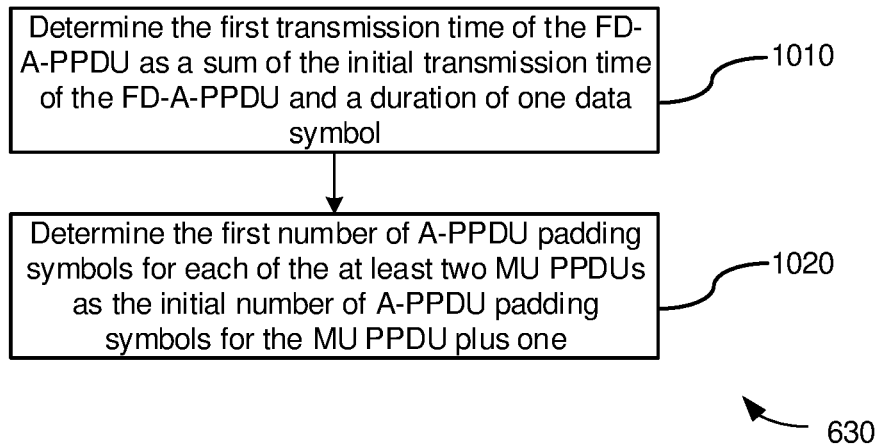
FIG. 10 shows another exemplary implementation of block 630.

FIG. 10 shows another exemplary implementation of block 630. As illustrated, block 630 may be implemented by blocks 1010 and 1020. At block 1010, the network device determines the first transmission time of the FD-A-PPDU as a sum of the initial transmission time of the FD-A-PPDU and a duration of one data symbol. At block 1020, the network device determines the first number of A-PPDU padding symbols for each of the at least two MU PPDUs as the initial number of A-PPDU padding symbols for the MU PPDU plus one. It should be noted a sequence of two steps implemented by blocks 1010 and 1020 is not limited to that illustrated in FIG. 10, and these two steps can occur at the same time of in any other appropriate sequence. Further, Although block 630 is illustrated here as involving both blocks 1010 and 920, block 630 may also be implemented by only block 1010 or block 1020, and the other step may be implemented by any other appropriate way.

In an embodiment, if the initial transmission time of HE MU PPDU is smaller than that of at least one EHT MU PPDU in the FD-A-PPDU, STBC is used in the HE MU PPDU and the initial number of A-PPDU padding symbols required for the HE MU PPDU is not a multiple of 2, the first number of A-PPDU padding symbols required for the i-th MU PPDU in the FD-A-PPDU is equal to its initial number of A-PPDU padding symbols plus one, i.e., $$N_{PAD-SYM}^{(i)} = N_{PAD-SYM,init}^{(i)} + 1 \quad \text{Equation (5);}$$

the actual transmission time of i-th MU PPDU is equal to its initial transmission time plus the number of A-PPDU padding symbols required for the i-th MU PPDU multiplied by a duration of one data symbol, i.e., $$\text{TXTIME}_{MU-PPDU}^{(i)} = \text{TXTIME}_{MU-PPDU,init}^{(i)} + N_{PAD-SYM}^{(i)} \cdot T_{SYM} \quad \text{Equation (6)}$$

and the first transmission time of FD-A-PPDU is equal to its initial transmission time plus a duration of one data symbol, i.e., $$\text{TXTIME}_{A-PPDU} = \text{TXTIME}_{A-PPDU,init} + T_{SYM} \quad \text{Equation (7).}$$

Referring back to FIG. 6, at block 640, the network device generates the FD-A-PPDU based on the first transmission time of the FD-A-PPDU and the first number of A-PPDU padding symbols for each of the at least two MU PPDUs.

Figure 11:
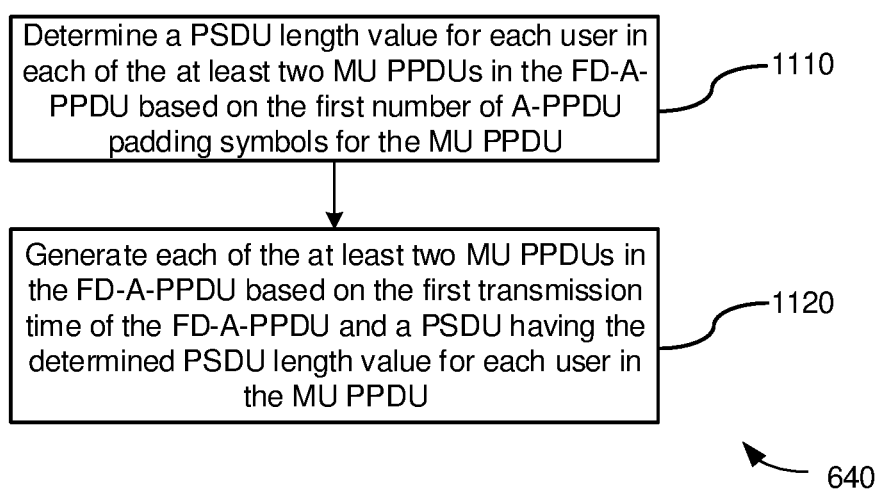
FIG. 11 shows an exemplary implementation of block 640.

FIG. 11 shows another exemplary implementation of block 640. As illustrated, block 640 may be implemented by blocks 1110 and 1120. At block 1110, the network device determines a PSDU length value for each user in each of the at least two MU PPDUs in the FD-A-PPDU based on the first number of A-PPDU padding symbols for the MU PPDU. At block 1120, the network device generates each of the at least two MU PPDUs in the FD-A-PPDU based on the first transmission time of the FD-A-PPDU and a PSDU having the determined PSDU length value for each user in the MU PPDU.

As an example, for each user in the i-th MU PPDU, the PSDU length value may be given by:

$$\text{PSDU\_LENGTH}_u^{(i)} = \quad \text{Equation (8)}$$

$$\text{floor}\left(\frac{N_{PAD,Pre-FEC,u}^{(i)} + N_{PAD-SYM}^{(i)} N_{DBPS,u}^{(i)} + \text{APEP\_LENGTH}_u^{(i)}}{8}\right),$$

where $N_{PAD,Pre-FEC,u}^{(i)}$ denotes the number of pre-Forward Error Correction (FEC) padding bits for user u in the i-th MU PPDU, which may be derived from transmission parameters for all users in the i-th MU PPDU included in the first primitive according to the IEEE 802.11ax specification if the i-th MU PPDU is a HE MU PPDU or the IEEE 802.11be specification if the i-th MU PPDU is an EHT MU PPDU; $N_{PAD-SYM}^{(i)}$ denotes the first number of A-PPDU padding symbols required for the i-th MU PPDU in the FD-A-PPDU; and $N_{DBPS,u}^{(i)}$ denotes the number of data bits per symbol for user u in the i-th MU PPDU, which may be derived from its transmission parameters included in the first primitive.

Then, each MU PPDU in the FD-A-PPDU may be generated based on the first transmission time of the FD-A-PPDU and a PSDU having the determined PSDU length value for each user in the MU PPDU.

For example, the PHY entity of the network device may generate each MU PPDU in the FD-A-PPDU using respective PSDUs according to respective PE field duration values and respective transmission parameters included in the first primitive. A MU PPDU in the FD-A-PPDU may be generate according to the IEEE 802.11ax specification if the MU PPDU is a HE MU PPDU or the IEEE 802.11be specification if the MU PPDU is an EHT MU PPDU.

Further, according to Equation (8), $N_{PAD-SYM}^{(i)} N_{DBPS,u}^{(i)}$ denotes the number of A-PPDU padding bits for user u in the i-th MU PPDU. In this way, the A-PPDU padding bits are absorbed into pre-FEC padding bits for the MU PPDU.

For example, after determining the PSDU length value for each user in each of the at least two MU PPDUs in the FD-A-PPDU, the PHY entity of the network device may issue a second primitive (e.g., PLME-TXTIME.confirm primitive) to the MAC sublayer of the network device, which contains a TXTIME including the first transmission time of the FD-A-PPDU and the determined PSDU length value for each user in each of the at least two MU PPDUs in the FD-A-PPDU. Then, the PHY entity and the MAC sublayer may perform a pre-FEC padding process, which absorbs the A-PPDU padding symbols into pre-FEC padding bits for each of the at least MU PPDUs in the FD-A-PPDU. Among the pre-FEC and A-PPDU padding bits for each user in each of the at least two MU PPDUs in the FD-A-PPDU, the MAC sublayer delivers a PSDU with MAC padding to fulfill respective PSDU length values. The PHY entity then determines the number of PHY padding bits to add and appends them to the PSDU (i.e., the PSDU having the determined PSDU length value). For example, the number of pre-FEC padding bits added by the PHY entity may be 0 to 7.

By considering the first number of A-PPDU padding symbols required for the i-th MU PPDU in the FD-A-PPDU in determining the PSDU length value, the A-PPDU padding bits can be absorbed into pre-FEC padding bits for the MU PPDU. In view of this, A-PPDU padding applied to a MU PPDU in the FD-A-PPDU is transparent to each intended STA for the MU PPDU. In other words, A-PPDU padding applied to a MU PPDU in the FD-A-PPDU has no impact on the receiver's behavior of each intended STA.

Referring back to FIG. 6, at block 650, the network device transmits the generated FD-A-PPDU to a plurality of terminal devices. Herein, each of the plurality of terminal devices can be a station (STA) applicable in IEEE 802.11be EHT WLAN or a next-generation WLAN after EHT WLAN such as Post-EHT WLAN. For example, for the generated FD-A-PPDU including one HE MU PPDU and one or two EHT MU PPDU, the plurality of STAs may correspondingly include one or more HE STAs and one or more EHT STAs, all of which may exist in a same EHT BSS.

In an embodiment, the data transmission method 600 may further include a step illustrated by block 660. At block 660, the network device determines an initial transmission time of each of the at least two MU PPDUs in the FD-A-PPDU based on the transmission parameters preset for all users in the MU PPDU and a Packet Extension (PE) field duration value of the MU PPDU. The transmission parameters preset for all users in the MU PPDU may be the same as mentioned above, e.g., those included in the first primitive according to the IEEE 802.11ax specification or IEEE 802.11be specification depending on whether the MU PPDU is a HE MU PPDU or an EHT MU PPDU.

As an example, for each MU PPDU in the FD-A-PPDU, the PE field duration value can be an initial PE field duration value for all users in the MU PPDU. For example, the initial PE field duration value for a MU PPDU in the FD-A-PPDU may be derived from the transmission parameters for all users in the MU PPDU included in the first primitive according to the IEEE 802.11ax specification or IEEE 802.11be specification depending on whether the MU PPDU is a HE MU PPDU or an EHT MU PPDU.

With the data transmission method 600 according to the above embodiments of the present disclosure, the network device may align data symbols among multiple MU PPDUs in a FD-A-PPDU.

However, since PE field durations of multiple MU PPDUs in a FD-A-PPDU may be different, a difference between the initial transmission time of FD-A-PPDU and the initial transmission time of a MU PPDU in FD-A-PPDU may not be a multiple of a duration of one data symbol. As a result, multiple MU PPDUs in the FD-A-PPDU may be still misaligned, and the misalignment time may be up to 12 µs.

Figure 12:
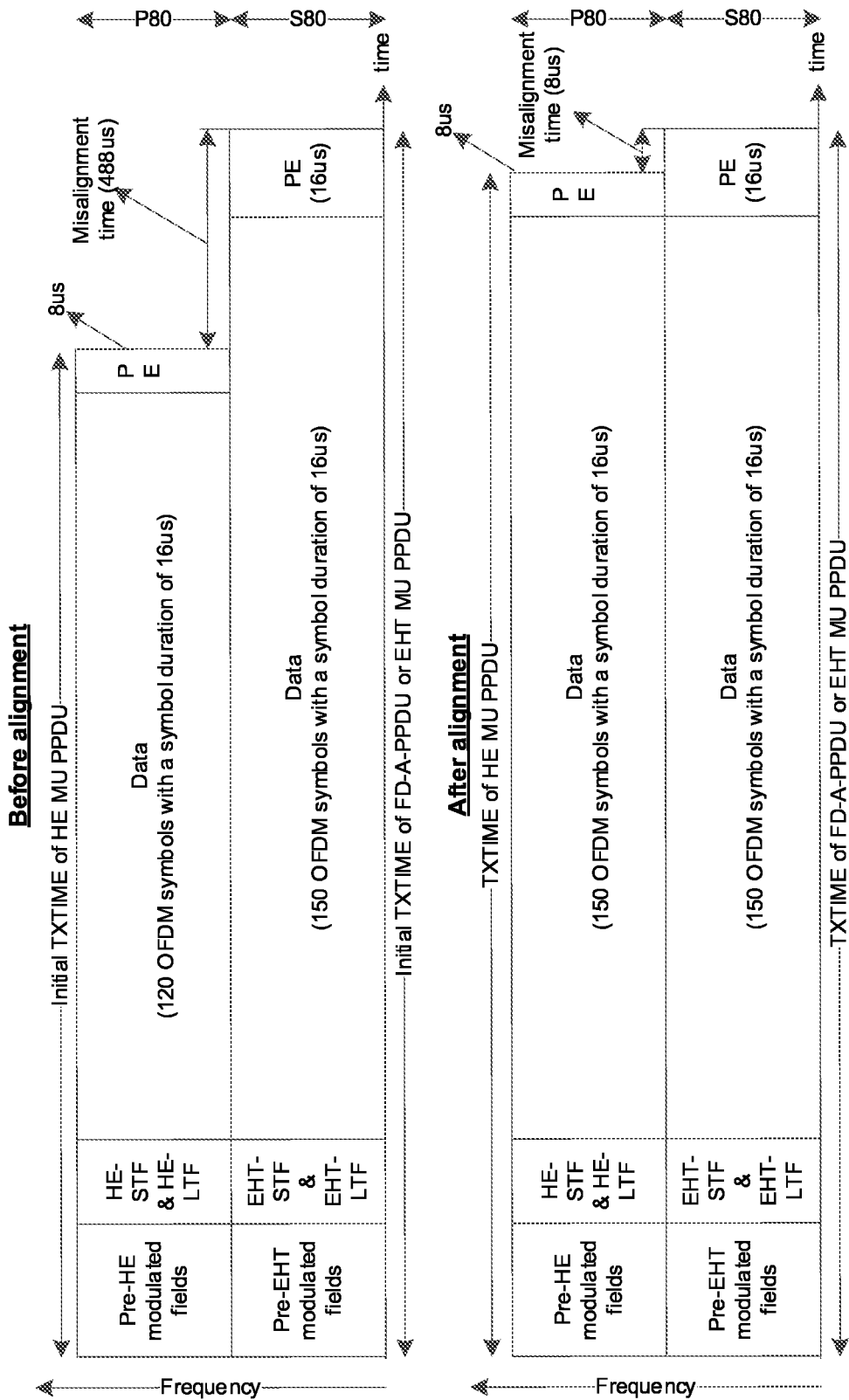
FIG. 12 is a schematic diagram showing an example of aligning one HE MU PPDU and one EHT MU PPDU in a 160 MHz BW FD-A-PPDU according to some embodiments of the present disclosure.

FIG. 12 is a schematic diagram showing an example of aligning one HE MU PPDU and one EHT MU PPDU in a 160 MHz BW FD-A-PPDU according to some embodiments of the present disclosure.

In this example, it is assumed the number of HE-LTF symbols in the HE MU PPDU is the same as a number of EHT-LTF symbols in the EHT MU PPDU, numbers of data symbols in the HE MU PPDU and the EHT MU PPDU are 120 and 150, respectively, a duration of one data symbol is 16 µs, and the PE field of the HE MU PPDU and EHT MU PPDU have a duration of 8 µs and 16 µs, respectively. As illustrated in FIG. 12, before alignment in the FD-A-PPDU, a misalignment time between data symbols in the HE MU PPDU and EHT MU PPDU is (150-120)*16 µs=480 µs, and a misalignment time between the PE fields of the HE MU PPDU and the EHT MU PPDU is 8 µs. In view of this, a total misalignment time between the HE MU PPDU and the EHT MU PPDU is 488 µs. According to the data transmission method 600, the initial transmission time of the FD-A-PPDU is a maximum of initial transmission times of the HE MU PPDU and the EHT MU PPDU, which are 120*16 µs and 150*16 µs, respectively, according to Equation (1). Thus, the initial transmission time of FD-A-PPDU in this example is 150*16 µs. Further, according to Equation (2), the initial number of A-PPDU padding symbols required for the HE MU PPDU is equal to:

$$\text{floor}\left(\frac{150*16\ \mu s - 120*16\ \mu s}{16\ \mu s}\right) = 30.$$

Further, in this example, the first number of A-PPDU padding symbols required for the HE MU PPDU is equal to its initial number of A-PPDU padding symbols. That is, 30 A-PPDU padding symbols (e.g., 30 OFDM symbols) are actually required for the HE MU PPDU. Then, 30 A-PPDU padding symbols may be added to data symbols of the HE MU PPDU, so that data symbols are aligned between the HE MU PPDU and the EHT MU PPDU. After such alignment in the FD-A-PPDU, only the misalignment time between the PE fields of the HE MU PPDU and the EHT MU PPDU remains, and thus the total misalignment time between the HE MU PPDU and EHT MU PPDU is reduced to 8 µs.

As another example, it is assumed STBC is used in the HE MU PPDU, the number of HE-LTF symbols in the HE MU PPDU is the same as a number of EHT-LTF symbols in the EHT MU PPDU, numbers of data symbols in the HE MU PPDU and the EHT MU PPDU are 120 and 151, respectively, a duration of one data symbol is 16 µs, and the PE fields of the HE MU PPDU and EHT MU PPDU have a duration of 0 µs and 20 µs, respectively. In this example, before alignment in the FD-A-PPDU, a misalignment time between data symbols in the HE MU PPDU and EHT MU PPDU is (151-120)*16 µs=496 µs, and a misalignment time between the PE fields of the HE MU PPDU and the EHT MU PPDU is 20 µs. In view of this, a total misalignment time between the HE MU PPDU and the EHT MU PPDU is 516 µs. According to the data transmission method 600, the initial transmission time of the FD-A-PPDU is a maximum of initial transmission times of the HE MU PPDU and the EHT MU PPDU, which are 120*16 µs and 151*16 µs, respectively, according to Equation (1). Thus, the initial transmission time of FD-A-PPDU in this example is 151*16 µs. Further, according to Equation (2), the initial number of A-PPDU padding symbols required for the HE MU PPDU is equal to 31. Then, according to Equation (5), the first number of A-PPDU padding symbols required for the HE MU PPDU is equal to its initial number of A-PPDU padding symbols plus one. That is, 32 A-PPDU padding symbols (e.g., 32 OFDM symbols) are actually required for the HE MU PPDU. Then, 32 A-PPDU padding symbols may be added to data symbols of the HE MU PPDU. After such alignment in the FD-A-PPDU, the total misalignment time between the HE MU PPDU and EHT MU PPDU is 516 µs−32*16 µs=4 µs. That is, the total misalignment time may be reduced to 4 µs.

In view of such misalignment time, according to an embodiment of the present disclosure, the data transmission method 600 may further include a step as illustrated by block 670. At block 670, the network device determines the PE field duration value based on initial PE field duration values for all of the at least two MU PPDUs in the FD-A-PPDU. Here, the network device may determine the PE field duration value as a maximum of the initial PE field duration values for all of the at least two MU PPDUs in the FD-A-PPDU, or a smaller one of 16 and a maximum of the initial PE field duration values for all of the at least two MU PPDUs in the FD-A-PPDU. That is, the determined PE field duration value is the same for each MU PPDU in the FD-A-PPDU, so that PE fields of different MU PPDUs in the FD-A-PPDU can be aligned. In view of this, the PE field duration value determined in this way may be referred to as a common PE field duration value.

For example, the initial PE field duration value for i-th MU PPDU, $T_{PE,init}^{(i)}$, may be derived from the transmission parameters for all users in the i-th MU PPDU included in the first primitive according to the IEEE 802.11ax specification if the i-th MU PPDU is a HE MU PPDU or the IEEE 802.11be specification if the i-th MU PPDU is an EHT MU PPDU. If the i-th MU PPDU is an EHT MU PPDU, the PE field duration value for the i-th MU PPDU in the FD-A-PPDU is given by:

$$T_{PE}^{(i)} = \max\{T_{PE,init}^{(j)}, j=1, \ldots, N_{MU\text{-}PPDU}\} \quad \text{Equation (9).}$$

If the i-th MU PPDU is a HE MU PPDU, the PE field duration for the i-th MU PPDU in the FD-A-PPDU is given by:

$$T_{PE}^{(i)} = \min\{\max\{T_{PE,init}^{(j)}, j=1, \ldots, N_{MU\text{-}PPDU}\}, 16\mu s\} \quad \text{Equation (10).}$$

In other words, the PE field duration value for any EHT MU PPDU in the FD-A-PPDU may be equal to a maximum of the initial PE field duration values of all the MU PPDUs in the FD-A-PPDU, and the PE field duration value for the HE MU PPDU in the FD-A-PPDU may be equal to a smaller one of 16 and the PE field duration value for any EHT MU PPDU in the FD-A-PPDU since the PE field duration value for a HE PPDU is up to 16 vs.

Alternatively, the PE field duration value for any EHT MU PPDU in the FD-A-PPDU shall not exceed 16 vs. In this case, according to Equation (9) and Equation (10), a common PE field duration value is used for all the MU PPDUs in the FD-A-PPDU.

According to this embodiment, the data transmission method 600 can replace the initial PE field duration value used in the steps illustrated by block 640 and block 660 (correspondingly blocks 610 and 620) with the PE field duration value as determined in the step as illustrate by block 670. In view of this, the present disclosure can further align PE field durations among multiple MU PPDUs in the FD-A-PPDU as much as possible, in addition to aligning data symbols.

Figure 13:
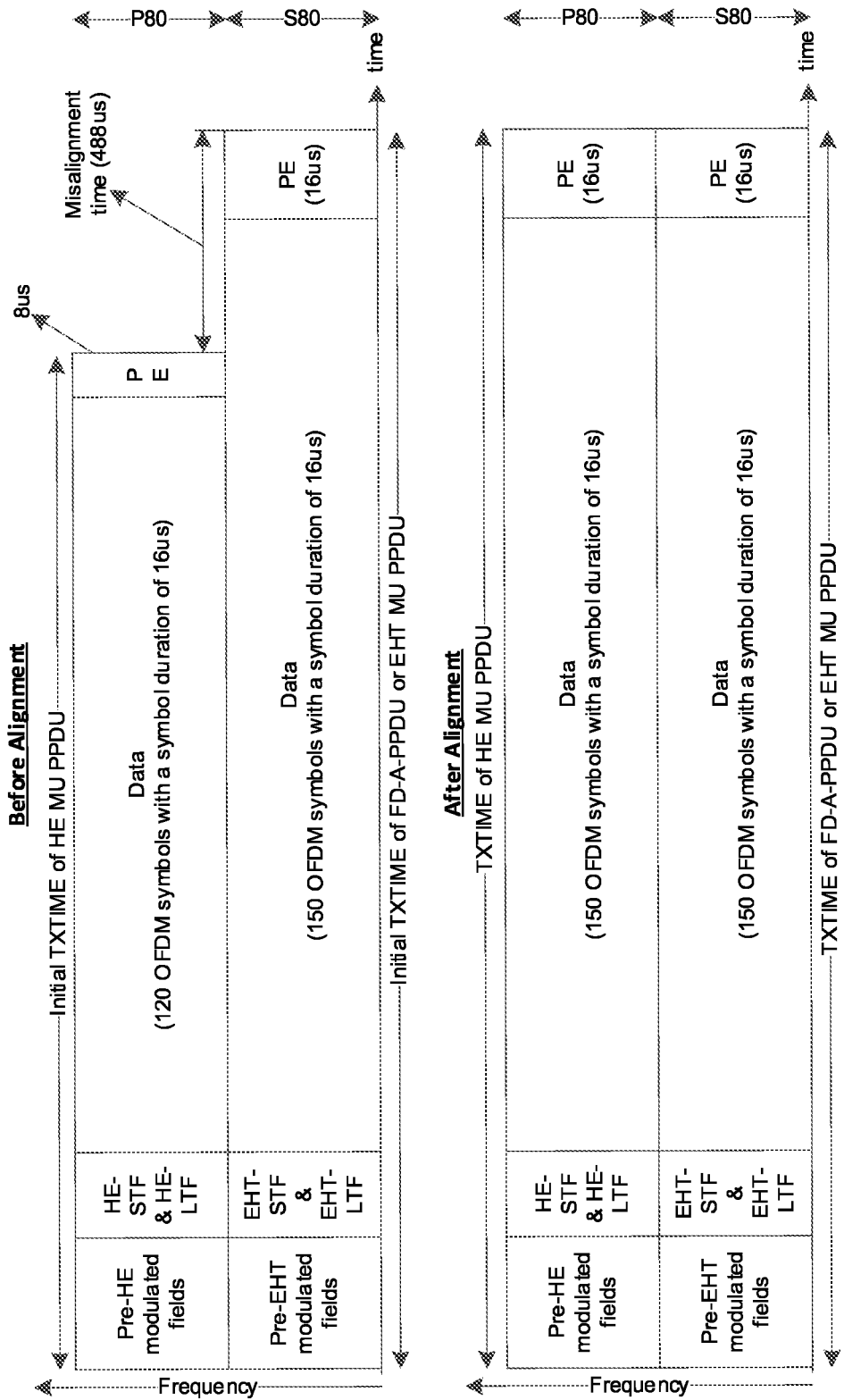
FIG. 13 is a schematic diagram showing another example of aligning one HE MU PPDU and one EHT MU PPDU in a 160 MHz BW FD-A-PPDU according to some embodiments of the present disclosure.

FIG. 13 is a schematic diagram showing another example of aligning one HE MU PPDU and one EHT MU PPDU in a 160 MHz BW FD-A-PPDU according to some embodiments of the present disclosure.

In this example, like that as illustrated in FIG. 12, it is assumed that the number of HE-LTF symbols in the HE MU PPDU is the same as a number of EHT-LTF symbols in the EHT MU PPDU, numbers of data symbols in the HE MU PPDU and EHT MU PPDU are 120 and 150, respectively, a duration of one data symbol is 16 μs, and the PE fields of the HE MU PPDU and EHT MU PPDU have a duration of 8 μs and 16 μs, respectively. As illustrated in FIG. 13, before alignment in the FD-A-PPDU, a total misalignment time between the HE MU PPDU and the EHT MU PPDU is 488 μs, including a misalignment time of (150−120)*16 μs=480 μs between data symbols in the HE MU PPDU and EHT MU PPDU and a misalignment time of 8 μs between the PE fields of the HE MU PPDU and the EHT MU PPDU. According to the data transmission method 600 having further alignment of PE field durations, the initial transmission time of the FD-A-PPDU is a maximum of initial transmission times of the HE MU PPDU and the EHT MU PPDU, which are 120*16 μs and 150*16 μs, respectively, according to Equation (1). Thus, the initial transmission time of FD-A-PPDU in this example is 150*16 μs. Further, according to Equation (2), the initial number of A-PPDU padding symbols required for the HE MU PPDU is equal to:

$$\text{floor}\left(\frac{150*16\ \mu s - 120*16\ \mu s}{16\ \mu s}\right) = 30.$$

Further, in this example, the first number of A-PPDU padding symbols required for the HE MU PPDU is equal to its initial number of A-PPDU padding symbols. That is, 30 A-PPDU padding symbols (e.g., 30 OFDM symbols) are actually required for the HE MU PPDU. Then, 30 A-PPDU padding symbols may be added to data symbols of the HE MU PPDU, so that data symbols are aligned between the HE MU PPDU and the EHT MU PPDU. Further, according to Equations (9) and (10), a common PE field duration value for both the HE MU PPDU and the EHT MU PPDU is determined as 16 μs. With the 30 A-PPDU padding symbols and the common PE field duration value of 16 μs, the HE MU PPDU can be aligned with the EHT MU PPDU. After such alignment in the FD-A-PPDU, the HE MU PPDU can be well aligned with the EHT MU PPDU.

Figure 14:
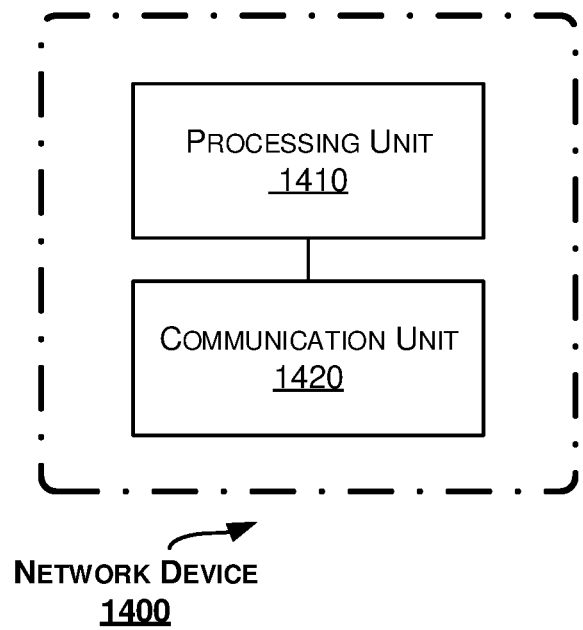
FIG. 14 is a block diagram of a network device 1400 according to an embodiment of the present disclosure.

Correspondingly to the data transmission method 600 as described above, a network device is provided. FIG. 14 is a block diagram of a network device 1400 according to an embodiment of the present disclosure. The network device 1400 can be e.g., an AP applicable in IEEE 802.11be EHT WLAN or a next-generation WLAN after EHT WLAN such as Post-EHT WLAN.

As shown in FIG. 14, the network device 1400 includes a processing unit 1410 and a communication unit 1420.

The processing unit 1410 is configured to obtain an initial transmission time of a FD-A-PPDU to be generated to contain at least two MU PPDUs; obtain an initial number of A-PPDU padding symbols for each of the at least two MU PPDUs; determine an first transmission time of the FD-A-PPDU and a first number of A-PPDU padding symbols for each of the at least two MU PPDUs based on the initial transmission time of the FD-A-PPDU and the initial number of A-PPDU padding symbols for each of the at least two MU PPDUs; and generate the FD-A-PPDU based on the first transmission time of the FD-A-PPDU and the first number of A-PPDU padding symbols for each of the at least two MU PPDUs. The communication unit 1420 is configured to transmit the generated FD-A-PPDU to a plurality of terminal devices.

In an embodiment, the FD-A-PPDU can include one HE MU PPDU and at least one EHT MU PPDU, e.g., one HE MU PPDU and one or two EHT MU PPDUs.

In an embodiment, the processing unit 1410 is further configured to obtain the initial transmission time of the FD-A-PPDU by determining the initial transmission time of the FD-A-PPDU as a maximum of initial transmission times of all of the at least two MU PPDUs in the FD-A-PPDU.

In an embodiment, the processing unit 1410 is further configured to obtain the initial number of A-PPDU padding symbols for each of the at least two MU PPDUs by determining the initial number of A-PPDU padding symbols for the MU PPDU based on a difference between the initial transmission time of the FD-A-PPDU and an initial transmission time of the MU PPDU. For example, the initial number of A-PPDU padding symbols required for a MU PPDU in the FD-A-PPDU may be equal to a ratio of the difference between the initial transmission time of the FD- A-PPDU and the initial transmission time of the MU PPDU to a duration of one data symbol.

In an embodiment, the processing unit 1410 is further configured to determine an initial transmission time of each of the at least two MU PPDUs in the FD-A-PPDU based on transmission parameters preset for all users in the MU PPDU and a PE field duration value of the MU PPDU.

In an embodiment, the PE field duration value is an initial PE field duration value for all users in the MU PPDU.

In an embodiment, the processing unit 1410 is further configured to determine the PE field duration value based on initial PE field duration values for all of the at least two MU PPDUs in the FD-A-PPDU.

In an embodiment, the processing unit 1410 is further configured to determine the PE field duration value based on initial PE field duration values for all of the at least two MU PPDUs in the FD-A-PPDU by determining the PE field duration value as a maximum of the initial PE field duration values for all of the at least two MU PPDUs in the FD-A-PPDU.

In an embodiment, the processing unit 1410 is further configured to determine the PE field duration value based on initial PE field duration values for all of the at least two MU PPDUs in the FD-A-PPDU by determining the PE field duration value as a minimum of 16 and a maximum of the initial PE field duration values for all of the at least two MU PPDUs in the FD-A-PPDU.

In an embodiment, the transmission parameters preset for all users in the MU PPDU include one or more of following parameters: a bandwidth allocation for the MU PPDU; information indicating a number of octets in an A-MPDU pre-EOF padding carried in a PSDU for each user; a RU allocation for each user; a number of spatial streams for each user; MCS for each user; and nominal packet padding for each user.

In an embodiment, the processing unit 1410 is further configured to determine the first transmission time of the FD-A-PPDU and the first number of A-PPDU padding symbols for each of the at least two MU PPDUs based on the initial transmission time of the FD-A-PPDU and the initial number of A-PPDU padding symbols for each of the at least two MU PPDUs by determining the first transmission time of the FD-A-PPDU as the initial transmission time of the FD-A-PPDU.

In an embodiment, the processing unit 1410 is further configured to determine the first transmission time of the FD-A-PPDU and the first number of A-PPDU padding symbols for each of the at least two MU PPDUs based on the initial transmission time of the FD-A-PPDU and the initial number of A-PPDU padding symbols for each of the at least two MU PPDUs by determining the first number of A-PPDU padding symbols for each of the at least two MU PPDUs as the initial number of A-PPDU padding symbols for the MU PPDU.

In an embodiment, the at least two MU PPDUs include one HE MU PPDU and at least one EHT MU PPDU, and any of the following conditions is satisfied: an initial transmission time of the HE MU PPDU is equal to or larger than that of any of the at least one EHT MU PPDU; the initial transmission time of the HE MU PPDU is smaller than that of any of the at least one EHT MU PPDU and STBC is not used in the HE MU PPDU; and the initial transmission time of the HE MU PPDU is smaller than that of any of the at least one EHT MU PPDU, STBC is used in the HE MU PPDU and the initial number of A-PPDU padding symbols required for the HE MU PPDU is a multiple of 2.

In an embodiment, the processing unit 1410 is further configured to determine the first transmission time of the FD-A-PPDU and the first number of A-PPDU padding symbols for each of the at least two MU PPDUs based on the initial transmission time of the FD-A-PPDU and the initial number of A-PPDU padding symbols for each of the at least two MU PPDUs by determining the first transmission time of the FD-A-PPDU as a sum of the initial transmission time of the FD-A-PPDU and a duration of one data symbol.

In an embodiment, the processing unit 1410 is further configured to determine the first transmission time of the FD-A-PPDU and the first number of A-PPDU padding symbols for each of the at least two MU PPDUs based on the initial transmission time of the FD-A-PPDU and the initial number of A-PPDU padding symbols for each of the at least two MU PPDUs by determining the first number of A-PPDU padding symbols for each of the at least two MU PPDUs as the initial number of A-PPDU padding symbols for the MU PPDU plus one.

In an embodiment, the at least two MU PPDUs include one HE MU PPDU and at least one EHT MU PPDU, an initial transmission time of the HE MU PPDU is smaller than that of any of the at least one EHT MU PPDU, STBC is used in the HE MU PPDU, and an initial number of A-PPDU padding symbols required for the HE MU PPDU is not a multiple of 2.

In an embodiment, the processing unit 1410 is further configured to generate the FD-A-PPDU based on the first transmission time of the FD-A-PPDU and the first number of A-PPDU padding symbols for each of the at least two MU PPDUs by determining a PSDU length value for each user in each of the at least two MU PPDUs in the FD-A-PPDU based on the first number of A-PPDU padding symbols for the MU PPDU; and generating each of the at least two MU PPDUs in the FD-A-PPDU based on the first transmission time of the FD-A-PPDU and a PSDU having the determined PSDU length value for each user in the MU PPDU.

In an embodiment, each of the plurality of terminal devices can be a STA applicable in IEEE 802.11be EHT WLAN or a next-generation WLAN after EHT WLAN such as Post-EHT WLAN.

In some embodiments, the processing unit 1410 can include one or more processors, and the communication unit 1420 can be a communication interface, a transceiver, a communication chip or an input-output interface of a System-on-Chip (SOC).

It should be understood that the network device 1400 according to the embodiment of the present disclosure may correspond to the network device in the data transmission method 600 according to the embodiments of the present disclosure, and the above and other operations and/or functions of each unit in the network device 1400 are to implement the method shown in FIG. 6, respectively. For the sake of brevity, the corresponding process of the network device in FIG. 6 will not be repeated here.

Figure 15:
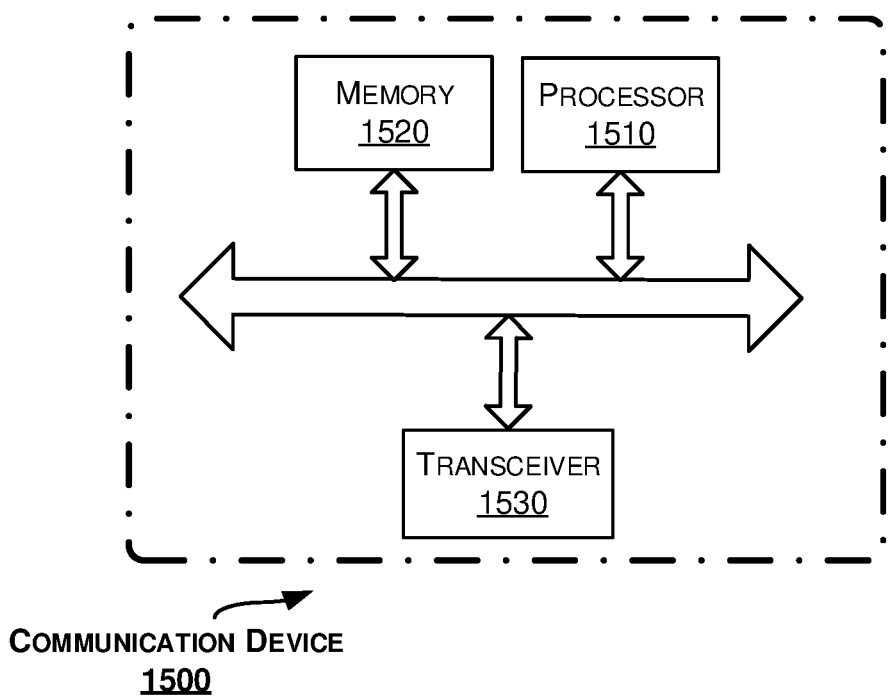
FIG. 15 is a block diagram of a communication device 1500 according to embodiments of the present disclosure.

FIG. 15 is a block diagram of a communication device 1500 according to embodiments of the present disclosure. The communication device 1500 shown in FIG. 15 includes a processor 1510, and the processor 1510 can invoke and run a computer program from a memory to implement the data transmission method 600 according to the embodiments of the present disclosure.

In an embodiment, as shown in FIG. 15, the communication device 1500 may further include a memory 1520. The processor 1510 may invoke and run a computer program from the memory 1520 to implement the data transmission method 600 according to the embodiments of the present disclosure.

The memory 1520 may be a separate device independent of the processor 1510, or may be integrated in the processor 1510.

In an embodiment, as shown in FIG. 15, the communication device 1500 may further include a transceiver 1530, and the processor 1510 may control the transceiver 1530 to communicate with other devices, e.g., transmitting information or data to other devices, or receiving information or data from other devices.

The transceiver 1530 may include a transmitter and a receiver. The transceiver 1530 may further include one or more antennas.

In an embodiment, the communication device 1500 may be a network device according to the embodiments of the present disclosure, and the communication device 1500 may implement the corresponding process implemented by the network device in the method according to the embodiments of the present disclosure.

Figure 16:
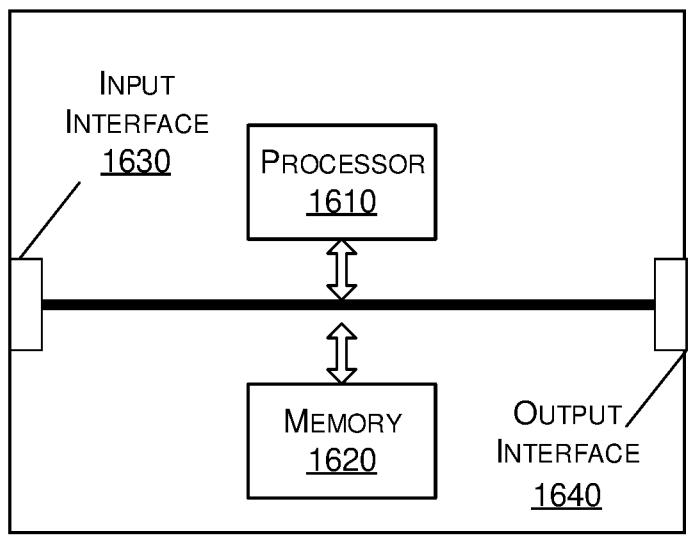
FIG. 16 is a block diagram of an apparatus 1600 according to embodiments of the present disclosure.

FIG. 16 is a block diagram of an apparatus 1600 according to embodiments of the present disclosure. The apparatus 1600 includes a processor 1610, which is configured to invoke and run a computer program from the memory to implement the data transmission method 600 according to the embodiments of the present disclosure.

In an embodiment, as shown in FIG. 16, the apparatus 1600 may further include a memory 1620. The processor 1610 may invoke and run a computer program from the memory 1620 to implement the data transmission method 600 according to the embodiments of the present disclosure.

The memory 1620 may be a separate device independent of the processor 1610, or may be integrated in the processor 1610.

In an embodiment, the apparatus 1600 may further include an input interface 1630. The processor 1610 may control the input interface 1630 to communicate with other devices or chips, e.g., obtaining information or data sent by other devices or chips.

In an embodiment, the apparatus 1600 may further include an output interface 1640. The processor 1610 can control the output interface 1640 to communicate with other devices or chips, e.g., outputting information or data to other devices or chips.

In an embodiment, the apparatus 1600 can be applied to the network device according to the embodiments of the present disclosure, and the apparatus can implement the corresponding processes implemented by the network device in each method according to the embodiments of the present disclosure.

In an embodiment, the apparatus can also be a chip. For example, the apparatus can be a system-level chip or a system-on-chip.

Figure 17:
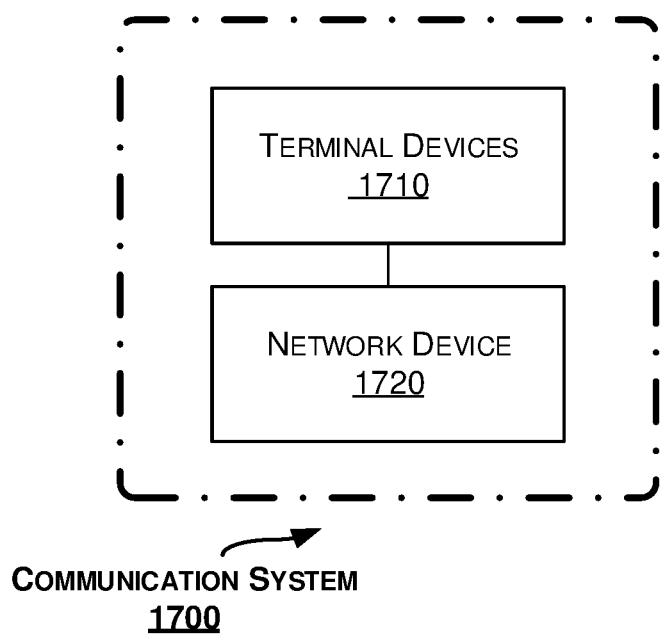
FIG. 17 is a block diagram of a communication system 1700 according to embodiments of the present disclosure.

FIG. 17 is a block diagram of a communication system 1700 according to embodiments of the present disclosure. As shown in FIG. 17, the communication system 1700 includes a plurality of terminal devices 1710 and a network device 1720.

The network device 1720 can be used to implement the corresponding function implemented by the network device in the above method, thereby achieving data transmissions to the plurality of terminal devices 1710. For example, the network device 1720 may generate a FD-A-PPDU having MU PPDUs aligned as much as possible, and transmit the generated FD-A-PPDU to the plurality of terminal devices 1710.

It should be understood that the processor according to the embodiments of the present disclosure may be a single CPU (Central Processing Unit), but could also include two or more processing units. For example, the processor may include general purpose microprocessors; instruction set processors and/or related chips sets and/or special purpose microprocessors such as Application Specific Integrated Circuits (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-Access Memory (RAM), a Read-Only Memory (ROM), or an EEPROM, and the computer program modules described above could in alternative embodiments be distributed on different computer program products in the form of memories.

The embodiments of the present disclosure also provide a computer readable storage medium having a computer program stored thereon.

In an embodiment, the computer readable storage medium can be applied to the network device according to the embodiments of the present disclosure, and the computer program causes a computer to execute the corresponding process implemented by the network device in each method according to the embodiments of the present disclosure.

The embodiments of the present disclosure also provide a computer program product including computer program instructions.

In an embodiment, the computer program product can be applied to the network device according to the embodiments of the present disclosure, and the computer program instructions cause the computer to perform the corresponding process implemented by the network device in each method according to the embodiments of the present disclosure.

The embodiment of the present disclosure also provides a computer program.

In an embodiment, the computer program can be applied to the network device according to the embodiments of the present disclosure. When executed by the computer, the computer program causes the computer to perform the corresponding process implemented by the network device in each method according to the embodiments of the present disclosure.

The disclosure has been described above with reference to embodiments thereof. It should be understood that various modifications, alternations and additions can be made by one skilled in the art without departing from the spirits and scope of the disclosure. Therefore, the scope of the disclosure is not limited to the above particular embodiments but only defined by the claims as attached.

What is claimed is:

1. A data transmission method applied in a network device, comprising:
   obtaining an initial transmission time of a Frequency Domain-Aggregated-Physical layer Protocol Data Unit (FD-A-PPDU) comprising at least two Multi-User (MU) PPDUs;
   obtaining an initial number of A-PPDU padding symbols for each of the at least two MU PPDUs;
   determining a first transmission time of the FD-A-PPDU and a first number of A-PPDU padding symbols for each of the at least two MU PPDUs based on the initial transmission time of the FD-A-PPDU and the initial number of A-PPDU padding symbols for each of the at least two MU PPDUs;
generating the FD-A-PPDU based on the first transmission time of the FD-A-PPDU and the first number of A-PPDU padding symbols for each of the at least two MU PPDUs; and
transmitting the generated FD-A-PPDU to a plurality of terminal devices.

2. The method of claim 1, wherein said obtaining the initial transmission time of the FD-A-PPDU comprises:
determining the initial transmission time of the FD-A-PPDU as a maximum of initial transmission times of all of the at least two MU PPDUs in the FD-A-PPDU.

3. The method of claim 2, further comprising:
determining an initial transmission time of each of the at least two MU PPDUs in the FD-A-PPDU based on transmission parameters preset for all users in the MU PPDU and a Packet Extension (PE) field duration value of the MU PPDU.

4. The method of claim 3, wherein the PE field duration value is an initial PE field duration value for all users in the MU PPDU.

5. The method of claim 3, further comprising:
determining the PE field duration value based on initial PE field duration values for all of the at least two MU PPDUs in the FD-A-PPDU.

6. The method of claim 5, wherein said determining the PE field duration value based on initial PE field duration values for all of the at least two MU PPDUs in the FD-A-PPDU comprises:
determining the PE field duration value as a maximum of the initial PE field duration values for all of the at least two MU PPDUs in the FD-A-PPDU.

7. The method of claim 5, wherein said determining the PE field duration value based on initial PE field duration values for all of the at least two MU PPDUs in the FD-A-PPDU comprises:
determining the PE field duration value as a smaller one of 16 and a maximum of the initial PE field duration values for all of the at least two MU PPDUs in the FD-A-PPDU.

8. The method of claim 3, wherein the transmission parameters preset for all users in the MU PPDU comprise one or more of following parameters:
a bandwidth allocation for the MU PPDU;
information indicating a number of octets in an Aggregate Medium Access Control Protocol Data Unit (A-MPDU) pre-End Of Frame (pre-EOF) padding carried in a Physical layer Service Data Unit (PSDU) for each user;
a Resource Unit (RU) allocation for each user;
a number of spatial streams for each user;
Modulation and Coding Scheme (MCS) for each user; and
nominal packet padding for each user.

9. The method of claim 1, wherein said obtaining the initial number of A-PPDU padding symbols for each of the at least two MU PPDUs comprises:
determining the initial number of A-PPDU padding symbols for the MU PPDU based on a difference between the initial transmission time of the FD-A-PPDU and an initial transmission time of the MU PPDU.

10. The method of claim 9, wherein the initial number of A-PPDU padding symbols for the MU PPDU is equal to a ratio of the difference between the initial transmission time of the FD-A-PPDU and the initial transmission time of the MU PPDU to a duration of one data symbol.

11. The method of claim 1, wherein said determining the first transmission time of the FD-A-PPDU and the first number of A-PPDU padding symbols for each of the at least two MU PPDUs based on the initial transmission time of the FD-A-PPDU and the initial number of A-PPDU padding symbols for each of the at least two MU PPDUs comprises:
determining the first transmission time of the FD-A-PPDU as the initial transmission time of the FD-A-PPDU.

12. The method of claim 11, wherein the at least two MU PPDUs comprise one High Efficiency (HE) MU PPDU and at least one Extremely High Throughput (EHT) MU PPDU, and any of the following conditions is satisfied:
an initial transmission time of the HE MU PPDU is equal to or larger than that of any of the at least one EHT MU PPDU;
the initial transmission time of the HE MU PPDU is smaller than that of any of the at least one EHT MU PPDU and Space-Time Block Coding (STBC) is not used in the HE MU PPDU; and
the initial transmission time of the HE MU PPDU is smaller than that of any of the at least one EHT MU PPDU, STBC is used in the HE MU PPDU and the initial number of A-PPDU padding symbols required for the HE MU PPDU is a multiple of 2.

13. The method of claim 1, wherein said determining the first transmission time of the FD-A-PPDU and the first number of A-PPDU padding symbols for each of the at least two MU PPDUs based on the initial transmission time of the FD-A-PPDU and the initial number of A-PPDU padding symbols for each of the at least two MU PPDUs comprises:
determining the first number of A-PPDU padding symbols for each of the at least two MU PPDUs as the initial number of A-PPDU padding symbols for the MU PPDU.

14. The method of claim 1, wherein said determining the first transmission time of the FD-A-PPDU and the first number of A-PPDU padding symbols for each of the at least two MU PPDUs based on the initial transmission time of the FD-A-PPDU and the initial number of A-PPDU padding symbols for each of the at least two MU PPDUs comprises:
determining the first transmission time of the FD-A-PPDU as a sum of the initial transmission time of the FD-A-PPDU and a duration of one data symbol.

15. The method of claim 14, wherein the at least two MU PPDUs comprise one High Efficiency (HE) MU PPDU and at least one Extremely High Throughput (EHT) MU PPDU, an initial transmission time of the HE MU PPDU is smaller than that of any of the at least one EHT MU PPDU, Space-Time Block Coding (STBC) is used in the HE MU PPDU, and an initial number of A-PPDU padding symbols required for the HE MU PPDU is not a multiple of 2.

16. The method of claim 1, wherein said determining the first transmission time of the FD-A-PPDU and the first number of A-PPDU padding symbols for each of the at least two MU PPDUs based on the initial transmission time of the FD-A-PPDU and the initial number of A-PPDU padding symbols for each of the at least two MU PPDUs comprises:
determining the first number of A-PPDU padding symbols for each of the at least two MU PPDUs as the initial number of A-PPDU padding symbols for the MU PPDU plus one.

17. The method of claim 1, wherein said generating the FD-A-PPDU based on the first transmission time of the FD-A-PPDU and the first number of A-PPDU padding symbols for each of the at least two MU PPDUs comprises:

determining a Physical layer Service Data Unit (PSDU) length value for each user in each of the at least two MU PPDUs in the FD-A-PPDU based on the first number of A-PPDU padding symbols for the MU PPDU; and generating each of the at least two MU PPDUs in the FD-A-PPDU based on the first transmission time of the FD-A-PPDU and a PSDU having the determined PSDU length value for each user in the MU PPDU.

18. The method of claim 1, wherein the at least two MU PPDUs comprise one High Efficiency (HE) MU PPDU and at least one Extremely High Throughput (EHT) MU PPDU.

19. The method of claim 1, wherein the network device is an Access Point (AP), and each of the plurality of terminal devices is a Station (STA).

20. A network device, comprising:
   a memory having a computer program stored thereon; and
   a processor configured to invoke and run the computer program whereby the network device is operative to perform a data transmission method comprising:
   obtaining an initial transmission time of a Frequency Domain-Aggregated-Physical layer Protocol Data Unit (FD-A-PPDU) comprising at least two Multi-User (MU) PPDUs;
   obtaining an initial number of A-PPDU padding symbols for each of the at least two MU PPDUs;
   determining a first transmission time of the FD-A-PPDU and a first number of A-PPDU padding symbols for each of the at least two MU PPDUs based on the initial transmission time of the FD-A-PPDU and the initial number of A-PPDU padding symbols for each of the at least two MU PPDUs;
   generating the FD-A-PPDU based on the first transmission time of the FD-A-PPDU and the first number of A-PPDU padding symbols for each of the at least two MU PPDUs; and
   transmitting the generated FD-A-PPDU to a plurality of terminal devices.

* * * * *